United States Patent [19]

Shimada et al.

[11] Patent Number: 4,683,491

[45] Date of Patent: Jul. 28, 1987

[54] DISPLAY SYSTEM COMPRISING A PLURALITY OF DISPLAY CELLS ARRANGED IN AN X-Y MATRIX AND A PLURALITY OF HORIZONTAL-EXTENDING BLINDS DISPOSED ADJACENT THE UPPER EDGES OF THE DISPLAY CELLS IN THE ROWS OF THE MATRIX

[75] Inventors: Satoshi Shimada; Nobuo Kitamura, both of Kanagawa; Kunio Shikakura; Namio Maeda, both of Tokyo, all of Japan

[73] Assignee: Sony Corporation, Tokyo, Japan

[21] Appl. No.: 725,806

[22] Filed: Apr. 22, 1985

[30] Foreign Application Priority Data

Apr. 24, 1984 [JP] Japan ................................ 59-82257
Nov. 20, 1984 [JP] Japan ................................ 59-244877

[51] Int. Cl.⁴ ........................ H04N 9/12; H04N 3/12; H04N 5/66; G09G 3/20

[52] U.S. Cl. ........................................ 358/56; 358/59; 358/230; 358/240; 358/241; 358/254; 358/255; 340/752; 340/766

[58] Field of Search .................. 358/56, 59, 230, 240, 358/241, 236, 250, 252, 253, 254, 255, 251; 350/344, 345, 276 SL, 337, 276 R; 40/547; 340/752, 766, 771, 780, 781, 782, 783, 784

[56] References Cited

U.S. PATENT DOCUMENTS

| | | | |
|---|---|---|---|
| 3,986,014 | 10/1976 | Katsui et al. | 350/345 |
| 4,097,902 | 6/1978 | Curnuck | 358/255 |
| 4,185,895 | 1/1980 | Stephens et al. | 350/345 |
| 4,276,633 | 6/1981 | Takami et al. | 350/345 |
| 4,444,465 | 4/1984 | Giulie et al. | 358/252 |
| 4,635,105 | 1/1987 | Favreau | 358/56 |

*Primary Examiner*—James J. Groody
*Assistant Examiner*—Randall S. Svihla

[57] ABSTRACT

A large-scale color picture display system comprises a plurality of fluorescent display cells arranged in an X-Y matrix to form a picture display device. Each display cell comprises a red, a green, and a blue fluorescent display element. Each of the display cells is provided with a horizontally-extending blind adjacent its upper edge. The blind has a black top surface to absorb light from the sun and sky, and a reflecting bottom surface to form a virtual image of part of the display cell so that a viewer situated below the color picture display device will see a picture which is continuous in the vertical direction. The reflecting bottom surface of the blind is electrically conductive and is grounded to prevent it from being electrified, for example by lightning, and to eliminate undesired radiation from the display system.

6 Claims, 42 Drawing Figures

| U1 | | | | U2 | | | |
|---|---|---|---|---|---|---|---|
| 201 | 202 | 203 | 204 | 213 | 214 | 215 | 216 |
| 201' | 202' | 203' | 204' | 213' | 214' | 215' | 216' |
| 205 | 206 | 207 | 208 | 217 | 218 | 219 | 220 |
| 205' | 206' | 207' | 208' | 217' | 218' | 219' | 220' |
| 209 | 210 | 211 | 212 | 221 | 222 | 223 | 224 |
| 209' | 210' | 211' | 212' | 221' | 222' | 223' | 224' |

FIG. 16A PRIOR ART (FP)
FIG. 16B PRIOR ART (UCK)
65μ
130μ
225 cycle
FIG. 16C PRIOR ART (ECK)
1
2
3
18
19
20
21
36
37
38
19 cycle
38 cycle
FIG. 16D PRIOR ART (SSP)

S1
S2
S36
S37
S38
FIG. 16F PRIOR ART (Data)
FIG. 16G PRIOR ART (SSP')

DISPLAY SYSTEM COMPRISING A PLURALITY OF DISPLAY CELLS ARRANGED IN AN X-Y MATRIX AND A PLURALITY OF HORIZONTAL-EXTENDING BLINDS DISPOSED ADJACENT THE UPPER EDGES OF THE DISPLAY CELLS IN THE ROWS OF THE MATRIX

BACKGROUND OF THE INVENTION

1. Field of the Invention

The present invention relates generally to a display system and in more particulary to a display system which is simple in construction but capable of displaying a desired picture with good quality.

2. Description of the Prior Art

A video display device in which a number of display cells are arranged in an X-Y matrix form and these display cells are respectively driven by desired data to display a desired picture has already been proposed.

The same applicant has proposed as the display cell usable in the above video display device the following ones.

Referring to FIGS. 1 to 4, which are a front view of a luminescent or fluorescent display cell, a sectional view taken on line A - A thereof, a sectional view taken on line B - B thereof, and a partially cut-away perspective view of the cell. In the figures, reference numeral 1 denotes a glass envalope comprising a front panel 1A, a rear plates 1B and a side wall 1C. Within the glass envelope 1 are disposed a plurality of luminescent or fluorescent display segments 2 (2R, 2G, 2B), a plurality of cathodes K ($K_R$, $K_G$, $K_B$) and first grids $G_1$ ($G_{1R}$, $G_{1G}$, $G_{1B}$) in corresponding relation to each display segment, and a common second grid (accelerating electrode) $G_2$. The display segments 2 each comprise a phosphor layer formed on the inner surface of the front panel 1A. There are formed three display segments 2R, 2G and 2B for the luminescence of red, green and blue, respectively. More particularly, as shown in FIG. 5, a carbon layer 3 as a conductive layer is printed in the form of a frame on the inner surface of the front panel 1A. In spaces in the frame, red, green and blue phosphor layers 2R, 2G and 2B are formed by printing as display segments so as to partially overlap the carbon layer 3. Throughout the surfaces of these phosphor layers a metal back layer 5 is formed, e.g. an aluminum layer, through a filming layer 4. Furthermore, in opposed relation to the display segments 2R, 2G and 2B comprising the above phosphor layers and inside the rear panel 1B wire cathodes $K_R$, $K_G$ and $K_B$ are positioned, first grids $G_{1R}$, $G_{1G}$ and $G_{1B}$ opposite to these wire cathodes, and the second grid $G_2$ in common to the three first grids $G_{1R}$, $G_{1G}$ and $G_{1B}$. Each wire cathode K is formed, for example, by coating the surface of a tungsten heater with carbonate as an electron emissive material. The wire cathodes $K_R$, $K_G$ and $K_B$ are each stretched between a pair of conductive support members 6 and 7 which are disposed on both side portions of the rear panel 1B. One support member 6 is for fixing one end of each wire cathode, while the other support member 7 is provided with a spring portion *7a* to which is fixed the other end of each wire cathode. According to this arrangement, an even extension of the wire cathode due to a rise of the temperature would be absorbed by the spring portion *7a*, and thus the wire cathode never becomes loose. The first grids $G_{1R}$, $G_{1G}$ and $G_{1B}$ are formed in a half-cylindrical shape having a cylindrical surface in corresponding relation to the wire cathodes, and a plurality of slits 8 are formed in the cylindrical surface at a predetermined pitch along the longitudinal direction of the same surface. The slits 8 are for the transmission therethrough of electrons radiated from the wire cathode K. The second grid $G_2$ is formed with slits 9 in portions corresponding to the first grids $G_{1R}$, $G_{1G}$ and $G_{1B}$ and in positions corresponding to the slits 8 of the first grids. In this case, slit portions 9R, 9G and 9B of the second grid G2 may be formed so as to have cylindrical surface concentric with the corresponding first grids $G_{1R}$, $G_{1G}$ and $G_{1B}$. In this construction, electron beams from the wire cathodes are radiated rectilinearly through the slits 8 and 9 of the first and second grids and are spread with respect to the longitudinal direction of the slits. On the other hand, the portions of the second grid in which are formed the slits 9 may be horizontal as shown in FIG. 6. In this case, the electron beam is radiated so that it passes through the second grid and then is curved somewhat inwardly with respect to the longitudinal direction of the slits, as shown in dotted line 30'.

On the other hand, a separator 10 formed of a conductive material is disposed to surround the display segments or elements 2R, 2G and 2B. The separator 10 not only serves as a shield for preventing a secondary electron 31 (see FIG. 6) induced by impingement of electron beam from cathode against the first or second grid $G_1$ or $G_2$ from rendering an adjacent display segment luminous, but also serves to form a diffusion lens which functions to spread electron beam 30 from each wire cathode K so that the electron beam is radiated throughout the corresponding display segment 2. In addition, the separator 10 is used also as power supply means for supplying a high voltage, e.g. 10 KV, to each display segment. In assembling, the separator 10 is supported between the front panel 1A and side wall 1C of the glass envelope 1 and fixed by frit. More specifically, as shown in FIG. 7, the separator 10 is in the form of a frame partitioned in threes to surround the display segments, and on first opposed upper ends thereof are formed outwardly projecting supporting pieces 11, while on the other opposed upper ends are formed anode leads 12 for the supply of high voltage (anode voltage). Furthermore, on the side portions of the separator 10 are formed outwardly bent elastic positioning pieces 13. When the separator 10 is inserted from above into the inside of side wall 1C, as shown in FIG. 8, the supporting pieces 11 abut the upper end face of the side wall 1C to thereby support the separator 10, and at the same time the bent portions 13 abut the inner surface of the side wall 1C to thereby position the separator 10 in central fashion. Also provided on the upper end portion of the separator 10 are inwardly bent lugs 14 each having a projection 15 formed on the surface thereof. When the front panel 1A is placed and sealed on the side wall 1C after enclosing the separator 10 in the side wall 1C, the projections 15 contact the carbon layer 3 or the metal back layer 5 (see FIG. 9). As a result, the high voltage from the anode leads 12 is fed in common to the display segments 2R, 2G and 2B. In an assembled state, the anode leads 12 to which is applied the high voltage are drawn out to the exterior through the sealed portion between the front panel 1A and the upper end face of the side wall 1C, while the leads of the wire cathodes K, first grid $G_1$, and second grid $G_2$ are drawn out to the exterior through a sealed portion between the rear plate 1B and the side wall 1C. The leads of the cathodes K, first grids $G_1$ and second grid $G_2$ are brought out together for supporting purposes. For example, in each of the first grids $G_{1R}$, $G_{1G}$ and $G_{1B}$, two leads on each side, namely, a total of four leads on both sides, are brought out as leads 16$G_1$, 17$G_1$ and 18$G_1$ (see FIG. 4). In the case of the second grid $G_2$, four leads 19$G_2$ are brought out corresponding to the four corners of the rear panel. Leads 20F of the cathodes K are brought out together to the right and left from both support members 6 and 7. The leads 20F of the cathodes are connected in common for each of the support members 6 and 7. Also with respect to each of the first and second grids $G_1$ and $G_2$, the corresponding leads are connected in common.

The glass envelope 1 is provided by sealing the front panel 1A, side wall 1C and rear plate 1B with respect to each other by frits 22 (see FIG. 9). To the rear plate 1B is a chip-off pipe 21 for gass exhaust fixed by frits.

Operation of the above construction will now be explained. An anode voltage of, say, 10 KV or so is supplied through the anode leads 12 to the red, green and blue display segments 2R, 2G and 2B. To each of the first grids $G_{1R}$, $G_{1G}$ and $G_{1B}$ is applied a voltage of, say, 0–30 V, while to the second grid $G_2$ is applied a voltage of, say, 300 V. The wire cathodes $K_R$, $K_G$ and $K_B$ are of 60–70 mW or so per wire. In this construction, the anode side and the second grid $G_2$ are fixed in voltage, while the voltage applied to the first grids $G_1$ *is changed to turn on and off the display segments selectively. More particularly, when OV is applied to a first grid* $G_1$, an electron beam from cathode K is cut off and the corresponding display segment 2 is not rendered luminous. When, say, 30 V is applied to the first grid $G_1$, and electron beam from cathode K passes through the first grid $G_1$, then is accelerated by the second grid $G_2$ and impinges upon the phosphor of the corresponding display segment 2 to make the latter luminous. At this time, the luminance is controlled by controlling the pulse width (duration) of the voltage (30 V) applied to the first grid $G_1$. Further, as shown in FIG. 6, the electron beam from cathode K is spread by the separator 10 and radiated to the entire surface of the display segment 2. When the electron beam from the cathode impinges upon the first and second grids, there are produced the secondary electrons 31 from these grids, but these secondary electrons are obstructed by the separator 10, so they do not impinge upon the adjacent display segment 2. In this way, by selectively controlling the voltage applied to the first grids, the display segments 2R, 2G and 2B are rendered luimnous selectively at a high luminance.

This luminescent or fluorescent display cell 40 is constructed in thin fashion as a whole. Besides, the low voltage-side leads such as the cathode and first and second grid leads are drawn out from the rear plate 1B side of the glass envelope 1, while the high voltage-side anode leads 12 are drawn out from the front panel 1A side. Therefore, possible dangers during discharge and wiring can be avoided, thus ensuring a stable luminescent or fluorscent display.

Moreover, since the anode voltage-applied separator 10 surrounds each display segment 2, a diffusion lens is formed by the separator 10. Therefore, even if only the first grids $G_1$ are curved and the second grid $G_2$ is flat (as shown in FIG. 6), the electron beam from cathode K spreads laterally (in the direction of the slits) and is radiated to the entire surface of the display segment 2. At the same time, the secondary electron from the first or second grid is obstructed by the separator 10, so the adjacent cut-off segment is not rendered luminous.

In the case of a color display (for example, in the case of a 9300° K. white picture), the luminance mixing ratio is about 7% blue, about 13% red, and about 80% green. In the case where wire cathodes are used as an electron emission source, they are in many cases used in a temperature restriction area in order to maintain their service life. And the problem of making the luminance of the green cathode higher than that of the other cathodes can be solved by increasing the number of the green cathodes used. For example, two green cathodes $K_G$, one red cathode $K_R$, and one blue cathode $K_B$ may be used. As a result, the total amount of electrons for green becomes larger than that for red and blue, thus making it possible to effect a color display. It goes without saying that red and blue cathodes may also be used in plural numbers, which is effective in prolonging their service life. Thus, by increasing the number of green cathodes in comparison with the other cathodes, the luminance of green can be enhanced and a good white balance is obtainable. Consequently, an excessive load is not imposed on the cathodes, that is, the life of the luminescent or fluorescent display cell can be prolonged. Actually, two green cathodes are disposed in spaced relation at a distance of about 0.8 to 1 mm. As to the amount of electrons emitted, an increase of 70 to 80% can be expected though it does not become twice as large as that in the case of a single green cathode due to the electron scattering effect. Alternatively, the green luminance may be enhanced by making the area of the green phosphor layer larger than those of the red and blue phosphor layers.

Since the wire cathodes are used in the temperature restriction area, that is, the loading of the oxide cathode is set at a ratio of one to several tens to prevent a red-looking appearance, the amount of electrons emitted per cathode is small. One method for solving this problem may be to substantially enlarge the surface area of oxide by winding a tungsten wire spirally, for example. But, in the case of a long spiral, it is likely that there will occur loosening vibration of the cathode. In view of this point, such a construction as shown in FIGS. 10 and 11 is suggested.

In this example, a core 35 formed of a high-temperature material such as, for example, tungsten or molybdenum, is provided and its surface is coated with an insulating material 36 such $Al_2O_3$. Then tungsten wire 37 serving as a heater is wound spirally thereon and an electron emissive material 38, e.g. carbonate, is bonded to the spiral portion by spraying or electrodeposition to constitute a direct heating cathode 34. The core 35 is fixed at one end thereof to one support member 6 and at the other end thereof to the spring portion 7*a* of the other support member 7 by spot welding or other suitable means, it being stretched under tension. The tungsten wire is fixed between one support member 6 and a second support member 6' on the other side by spot welding or other suitable means.

Thus, in the above construction, the cathode is wound spirally onto the core 35 coated with the insulating material 36, and the core 35 is stretched by the spring portion, whereby problems such as shorting between spiral portions and thermal deformation of the spiral can be eliminated. Besides, the oxide surface area is substantially increased, and a uniform temperature distribution area (A) with reduced temperature difference between both ends and the center of the cathode becomes wider. As a result, the amount of electrons emitted can be increased, and as a whole, therefore, it is possible to increase the amount of allowable current per cathode. The curve I in FIG. 11 represents a temperature distribution.

Thus, the luminescent or fluorescent display cell is formed. In this case, since the separator supplied with the same high voltage as that applied to the display segments is positioned to surround the plural display segments, a diffusion lens is formed whereby an electron beam from the cathode is spread laterally and radiated to the entire surface of each display segment or element. Consequently, it is possible to make a display at a high luminance. Furthermore, by the presence of the separator, secondary electrodes from a control electrode or accelerating electrode are obstructed, not rendering the adjacent cut-off dispaly segment luminous, and thus a stable luminescent or fluorescent display can be effected.

When picture display device is formed by using the above luminescent or fluorescent display cell, the following assembling method is taken.

That is, a plurality of the above luminescent or fluorescent display cells 40, for example, 6 (column)×4 (row)=24 luminescent or fluorescent display cells are incorporated in a unit case 41 to form one unit as shown in FIG. 12.

Then, a plurality of the above units are arranged in an X−Y matrix form, for example, 7 (column)×5 (row)=35 to form a block and then 5 blocks are arranged laterally to form a submodule. Then, a plurality of the submodules are combined in an X−Y matrix form, for example, 9 (column)×4 (row)=36. By using a number of the submodules, a jumbo-size picture display tube of, for example, 25 m (column)×40 m(row) is constructed. In this case, the number of the display cells is $$36\times5\times35\times24=151,200$$

and the number of the display segments is 3 times the above number and hence about 450,000.

FIGS. 13A and 13B are respectively a front view and a cross-sectional view of whole of a built-up jumbo-size picture display device. The whole of this jumbo-size picture display device is a building which is, for example, 42 m in height and 47 m in width. The upper portion of this building is made as a display portion which is provided with 9 floors, each floor having the height of 2.688 m. On each floor there are located 4 submodules in the lateral direction. Further, on the lower portion of the building there are formed the stage for entertainments, an anteroom, the central control room for operating and managing the display device and the stage and so on.

By the above way, the picture display device is built. In this case, since 24 luminescent of fluorescent display cells from a unit and a number of the units are employed to assemble whole the picture display device,the display device becomes easy in handling and also easy in assembling. In this case, each unit is formed of a square shape of 40 cm in both height and width in the above example.

Further, the above picture display device will be explained hereinafter in connection with a signal flow.

FIG. 14 is a systematic block diagram showing an example of the video display system according to the present invention. In this example, the video signals from a television camera 101, a VTR (video tape recorder) 102, a tuner 103 and so on are selected by an input change-over switch 104. These video signals are each a composite video signal of, for example, the NTSC system. The video signal selected by the switch 104 is supplied to a decoder 105 in which it is decoded to three color component signals of red, green and blue. These three color component signals are respectively supplied to A/D (analog-to-digital) converters 106R, 106G and 106B and then converted to 8 bit parallel digital signals, respectively.

These digital signals are supplied alternately to memories 171 (171R, 171G, 171B) and memories 172 (172R, 172G, 172B) each of which has one field memory capacity. These memories 171 and 172 each form a scanning converter which provides 4 horizontal lines from 5 horizontal lines. Further, for 189 horizontal lines, for example, selected from each field of the scanning converted signal, there are derived one output at every 3 horizontal lines, totally 63 (×8 bit parallel) outputs.

In this case, the order to derive the signal from the scanning converter is a specific one such that after the supply of the signal to one of the units described previously is completed, the supply of the signal to the next neighboring or adjacent unit will be done. That is, as shown in FIG. 15, when there are two adjacent units $U_1$ and $U_2$, in one field the digital data for a segment corresponding to each cell is sequentially derived from one memory in the numbered order and after the segment data corresponding to three horizontal lines 201 to 204, 205 to 208 and 209 to 212 in the left unit $U_1$ are completely derived, the segment data corresponding to three horizontal lines 213 to 216, 217 to 220 and 221 to 224 in the right unit $U_2$ are derived. Then, the segment data deriving is shifted to the right side unit successively. The segment data corresponding to the horizontal lines marked by the corresponding numbers with dash in FIG. 19 are derived from the other memory in the next field by the interlace scanning.

These segment data are derived at the same time from the respective memories 171 or 172, respectively. This data deriving is carried out such that 63 data at every 3 lines are simultaneously derived. The data thus derived are supplied to a data selector 108 in which at every field the red, green and blue data are dot-sequentially selected from the memory in which no writing is carried out to thereby form the data signal of 63 (×8 bit parallel). These data signal formed are fed to a multiplexer 109 in which 8 bit parallel signals are respectively converted to serial data signals. The signals thus converted are supplied to an optical converter 110 and then converted thereby to the corresponding optical signal.

The optical signals of 63 data at every 3 horizontal lines are transmitted through optical-fiber cables 301, 302, . . . 363 to center portions of lateral groups 401, 402, . . . 463 respectively where each group represents the total units of the display device laterally arranged.

Then, for example, in the upper most group 401 of the units, the optical signal from the optical-fiber cable 301 is fed to a photo-electric converter 111 and converted thereby to the corresponding electrical signal. This converted data signal is supplied to a demultiplexer 112 in which the serial data signal is converted to the 8 bit parallel signal. This parallel data signal is supplied through a bus line 113 to, for example, 100 units $114_1$, $114_2$, . . . $114_{100}$, which are laterally arranged, in parallel at the same time.

The signal from the photo-electric converter 111 is further supplied to a sync. separator 115 in which synchronizing signals are formed by a predetermined pattern generator and so on. The synchronizing signals therefrom are fed to a timing generator circuit 116 in which there are respectively generated a frame pulse signal FP which is inverted at every field as shown in FIG. 16A, a unit clock signal (UCK) which has 255 cycles during a half period (1 field) of the frame pulse signal as shown in FIG. 16B, an element clock signal ECK which contains 38 cycles during two cycles of the unit clock signal $U_{2C}K$ as shown in FIG. 16C, and a start pulse SSP which is formed by one element clock signal amount at every inversion of the frame pulse signal as shown in FIG. 16D. These frame pulse signal, unit clock signal and element clock signal are supplied together with the above data signal through the bus line 113 to the respective units $114_1$, $114_2$, . . . $114_{1000}$ in parallel while the start pulse is supplied to the first unit $114_1$.

The operation similar to the above is carried out in each of the 63 groups 401, 402, . . . 463.

In each of the units above, the signal translating circuit is formed as shown in FIG. 17. In FIG. 17, reference numeral 121 designates a shift register having 38 stages. In this case, the element clock signal ECK from the timing generator circuit 116 through the bus line 113 is supplied to the clock input terminal of the shift register 121 and the start pulse SSP is supplied to its data input terminal. Then, from the respective stages of the shift register 121, there are delivered sequentially shifted signals $S_1$, $S_2$, . . . $S_{38}$ as shown in FIG. 16E. The signals S1 to S36 of these signals $S_1$ to $S_{38}$ are respectively supplied to the elements 201R, 201G, 201B, 202R, 202G, 202B, .. 212R, 212G, 212B of each of cells 201 to 212 and to elements 201'R, 201'G, 201'B, 202'R, 202'G, 202'B, . . . 212'R, 212'G, 212'B of each of the cells 201' to 212'. In FIG. 17, the circuits in one-dot chain line block are equivalent with one another.

The data signal, as shown in FIG. 16, from the bus line 113 are supplied to all the elements 201R to 212'B in parallel. The frame pulse signal FP is supplied to the elements 201R to 212B and to the elements 201'R to 212'B after being reversed in phase by an inverter 122.

The signal $S_{38}$ from the shift register 121 is supplied to a D-type flip-flop 123 which then produces a start pulse signal SSP' to be supplied to the next neighboring unit as shown in FIG. 16G.

The signal circuit which will drive each element is constructed as shown in FIG. 18. In FIG. 18, reference numeral 131 designates a latching circuit of 8-bit which is supplied at its data input terminals with the data signal from the bus line 113. An AND circuit 132 is provided which is supplied with the frame pulse signal FP or its inverted signal and one of the signals $S_1$ to $S_{36}$ . The output from the AND circuit 132 is supplied to the control terminal of the latching circuit 131. A down counter 133 of 8-bit is provided which is supplied at its preset terminal with the output from the latching circuit 131, at its load terminal with the load pulse (signal $S_{38}$) from the shift register 121 and at its clock input terminal with the unit clock signal UCK from the bus line 113, respectively. When the counter 133 is in a condition except all-zero condition, it produces an output signal which is supplied to the first grid $G_1$ of each element mentioned above. The output signal of the counter 133 is phase-inverted by an inverter 134 and then supplied to the counter-stop terminal of the counter 133.

Accordingly, in each element of each unit, at the timings of the signals $S_1$ to $S_{36}$, the data from the bus line 113 are latched to the latching circuit 131 of the corresponding element and then held therein. The data held therein are preset to the counter 133 at the timing of the signal $S_{38}$. The preset data are then counted down unitl the counter 133 becomes in all-zero condition so that at the output terminal of the counter 133 there are developed the PWM (pulse width modulated) signals in accordance with each data signal. In this case, the counter 133 counts down the preset data in response to the unit clock signal UCK. Since this unit clock signal has 25 cycles during 1 field period, at the data being largest value, a display element is displayed during one field period continuously while at the data being smallest value the display element is not displayed so that the display therebetween can be divided into 256 brightness steps. The first grid of each element can be driven by the PWM signal.

Further, at the timing of the signal $S_{38}$ the start pulse signal for the next neighboring unit is produced. Thereafter, the operation similar to the above operation is sequentially carried out for 100 units laterally arranged. Moreover, the data latching operation of each unit is performed during the 2-cycle period of the unit clock signal UCK so that such operation for 100 unit laterally arranged is completed in 200 cycles. Therefore, by utilizing the remaining 55 cycles, special control signals such as the synchronizing signal and so on can be transmitted.

Since in the next field the frame pulse signal FP is inverted in phase, the similar operation is carried out for the other picture elements of the interlace scanning. At this time, the preset pulse is supplied to the picture elements which were driven in the previous field, so that the same display is performed twice on each picture element during the successive 2 field intervals.

Thus, the displays are perfomed on 100 units which are laterally arranged. Further, such display is performed for the 63 vertical direction groups of units in parallel at the same time, whereby whole a picture is displayed.

Further, in the above display device, a drive circuit which drives each luminescent display cell is constructed as shown in FIG. 19. In FIG. 19, the red, green and blue PWM signals from the above PWM signal forming circuit 500 are respectively supplied to bases of switching transistors 501R, 501G and 501B. The emitters of these transistors 501R, 501G and 501B are respectively grounded and the collectors thereof are respectively connected through resistors 502R, 502G and 502B of high resistive value, for example, 100 KΩ to the first grids $G_{1R}$, $G_{1G}$ and $G_{1B}$ of each picture element. A power source 503 of, for example, 50 V that is connected to the second grid $G_2$ is connected through resistors 504R, 504G and 504B of high resistive value, for example, 100 kΩ to the collectors of the transistors 501R, 501G and 501B.

Furthermore, the cathodes $K_R$, $K_G$ and $K_B$ are heated by a voltage source 505 of 1.4 V and the electron (electron emission) thus emitted impinges through the first grids $G_{1R}$, $G_{1G}$ and $G_{1B}$ and the second grid $G_2$ on the phosphor targets (anodes) $T_R$, $T_G$ and $T_B$ to which a voltage from a high voltage terminal 506 of, for example, 10 kV is applied and hence the phosphors are brightened. At the same time, the PWM signals are supplied to the transistors 501R, 501G and 501B so that when the transistors 501R, 501G and 501B are turned on and hence the voltages at the first grids $G_{1R}$, $G_{1G}$ and $G_{1B}$ become 0 volt, the electron emissions from the cathodes $K_R$, $K_G$ and KB are cut off, while when the transistors 501R, 501G and 501B are turned off and the voltages of the first grids $G_{1R}$, $G_{1G}$ and $G_{1B}$ become more than, for example, 3 V, the electron emission is radiated on the targets $T_R$, $T_G$ and $T_B$, thus the brightness control being carried out by the PW signal.

In this circuit, since the voltage from the voltage source 503 of 50 V is applied through the resistors 504R, 502R; 504G, 502G; and 504B, 502B of high resistive value to the first grids $G_{1R}$, $G_{1G}$ and $G_{1B}$, the respective grid currents $I_{GR}$, $I_{GG}$ and $I_{GB}$ become constant currents.

In this case, the cathode current Ik which is proportional to the electron emission, the target current IT which is proportional to the brightness and the grid current IG satisfy the relation expressed as $$Ik = IG + IT$$

On the other hand, if an open area factor of the grid is taken as $\eta$, the cathode current Ik and the grid current IG satisfy the relation expressed as $$IG = (1-\eta)Ik$$

Modifying the above equations yields $$IT = \frac{\eta}{1-\eta} IG$$

Thus, the target current relating to the brightness is a value which is proportional to the grid current.

Accordingly, in the above circuit, when the grid currents $I_{GR}$, $I_{GG}$ and $I_{GB}$ become the constant currents, the target current becomes constant and hence the brightness is made constant.

In other words, since the resistive values of the resistors 504R, 502R; 504G, 502G; and 504B, 502B are selected so as to become enoughly large relative to the equivalent impedance when the cathodes $K_R$, $K_G$ and $K_B$ are seen from the first grids $G_{1R}$, $G_{1G}$ and $G_{1B}$ the extra electrons caused by the fluctuation of the cathode emission characteristic are absorbed by the first grids $G_{1R}$, $G_{1G}$ and $G_{1B}$ so that the target current which reaches the phosphor becomes constant.

If one of each pair of the resistors 504R, 502R; 504G, 502G; and 504B, 502B is only provided with the resistive value of 200 kΩ, the same constant current effect can be achieved. However, when only the resistors 502R, 502G and 502B are used as 200 kΩ in resistive value, the voltage of 500 V is directly applied to the transistors 501R, 501G and 501B so that it is necessary to increase the withstanding voltage of these transistors 501R, 501G and 501B. While, when only the resistors 504R, 504G and 504B are used as 200 kΩ in resistive value, there is a fear that the transistors 501R, 501G and 501B will be destroyed by the discharge from the display screen side and so on. And, in order to protect the transistors 501R, 501G and 501B from the destruction, it is suitable that a pair of resistors are used as the example mentioned above.

Furthermore, there is a fear that the constant current will be fluctuated by the fluctuation of the resistors 502R, 504R; 502G, 504G; and 502B, 504B. However, this will cause no substantial problem if a resistor having an error of within about 5% is used. Such resistors are easily available on the market.

Thus, a jumbo-size picture of 25 m (column)×40 m (row) is displayed. According to the above picture display system, since the data are sequentially transmitted at every unit and after the data transmission of one display unit is completed, the data of the next neighboring display unit is transmitted, the display operation is completed at each unit. As a result, the wiring between the respective units is only one line to transmit the start pulse SSP′ from one unit to the next unit so that the connection thereamong becomes quite simple. The supply of the data signal and so on from the bus line to each unit can be performed by using a multi-contact connector.

Therefore, when the units are attached, exchange or the like, the work becomes simple and the assembling and repairing thereof become quite easy. For example, when one unit becomes out of order, it is sufficient that the troubled unit is exchanged for a new good unit. Upon this exchange, since the number of the lines for electrical connection is small, the exchange can be done rapidly and easily. Further, such a fear that any trouble is caused by the contact miss and so on can be reduced.

Further, as emergency measure, it is enough that a counter which can count up to 38 is connected between the input and output terminals for the start pulse of a troubled unit and then this troubled unit is removed. In this case, no bad influence exerts on the other units. Furthermore, when the operation of a certain unit itself is checked, since the signal is completed within the unit, the check is very easy.

Also since the data is transmitted in parallel to every laterally arranged unit, the transmission speed is made low. That is, the data transmission speed in the above example becomes as follows.

$$60 \times 255 \times \frac{38}{2} = 290.7 \text{ (kHz)}$$

This speed is lower than the tolerable range (300 kHz) of a flat cable (bus line), so that a conventional flat cable becomes possible to be employed.

Further, the data transmission is such one that the data of 2-field amounts of the interlace scanning are transmitted in one frame interval and the data is rewritten only once in each picture element at one frame interval. However, the display is repeated in sequential 2 fields and the display frequency is 60 Hz so that the generation of flicker can be suppressed.

Further, in the above display device, the first grid current is made as the constant current so that the brightness characteristics on the phosphor screen can be prevented from fluctuation from one to another. As a result, the brightness on the display screen can be prevented from being made irregular and, when the display device is formed as a color display device, display of good quality can be carried out without color irregularity. Since no brightness fluctuates, the brightness is made free of the adjustment. Accordingly, the adjustment of the whole of the display device can be simplified and the installment of the display device and the like can be made easy.

However, in the case of this display device, since the whole video display device is placed in the outside, the luminescent or fluorescent display cells and so on thereof are exposed to the weather elements and the direct rays of the sun. For this reason, the luminescent or fluorescent display cells and so on must be disposed with great stability. On the other hand, since the number of the luminescent or fluorescent display cells is huge i.e. hundreds of thousands, they must be made to be attached to the display device with ease upon manufacturing.

Further, the display unit must be attached and detached safely and easily for maintenance, inspection and so on. Furthermore, the signals must be supplied to these display units stably and easily.

Since the display system is jumbo-size, when a certain unit becomes out of order, such wrong unit must be found out with ease.

Furthermore, since the display system is installed at a position higher than that of viewers, the display must be prevented from being disturbed by the reflection of sunshine and sky blue of the sky and so on. Further, since there is a spacing between the adjacent fluorescent display cells because of the structure of the display system, it is necessary to prevent the display from being made discontinuous particularly in the vertical direction.

In addition, due to the structure of the display system, there is a fear that the luminescent or fluorescent display surface will become high in temperature. This requires a cooling means which can effectively cool such luminescent or fluorescent display surface whose temperature becomes high.

OBJECTS AND SUMMARY OF THE INVENTION

Accordingly, it is an object of the present invention to provide a display system of a simple construction which can display a desired picture of good quality.

It is another object of the present invention to provide a display system having a plurality of display cells arranged in the vertical direction, in which each of the display cells is provided with a blind at the upper side, this blind having a black surface at the top and a reflecting surface at the bottom.

According to one aspect of the present invention, there is provided a display system having a plurality of fluorescent display cells arranged in an X - Y matrix form, in which each of the display cells is provided with a blind at the upper side, the blind having a black surface at the top thereof and a conductive reflecting surface at the bottom thereof and the conductive reflecting surface is electrically grounded.

These and other objects, features and advantages of the present invention will become apparent from the following detailed description of the preferred embodiments taken in conjunction with the accompanying drawings, throughout which like reference numerals designate like elements and parts.

BRIEF DESCRIPTION OF THE DRAWINGS

FIG. 2 is a sectional view taken on line A—A of

Figure 1:
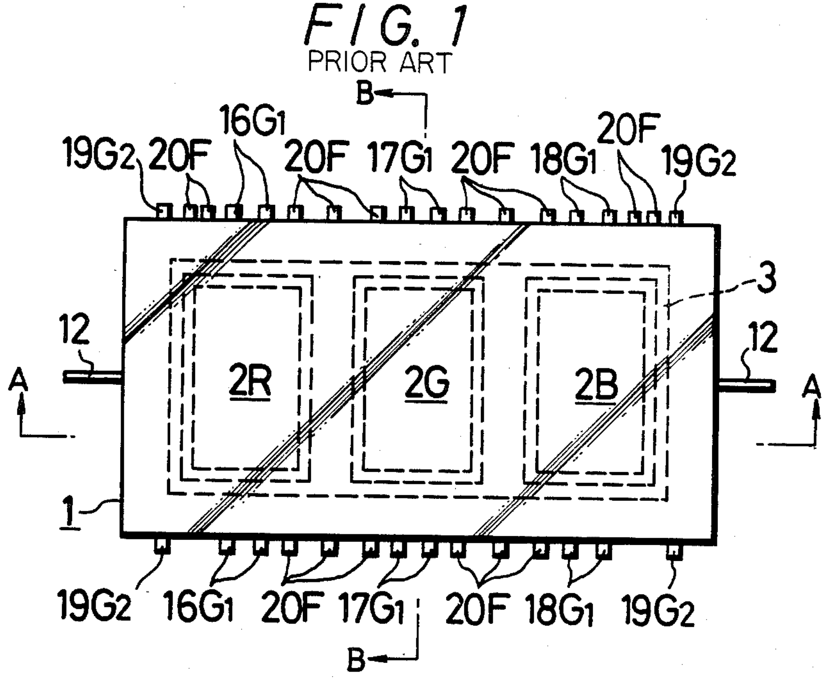
FIG. 1 PRIOR ART
FIG. 1 is a front view of a luminescent or fluorescent display cell used in the present invention.
Figure 2:
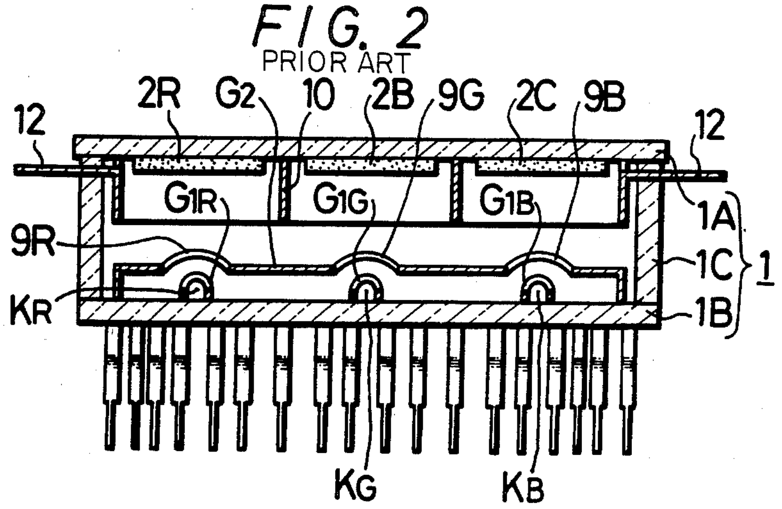
FIG. 2 PRIOR ART
Figure 3:
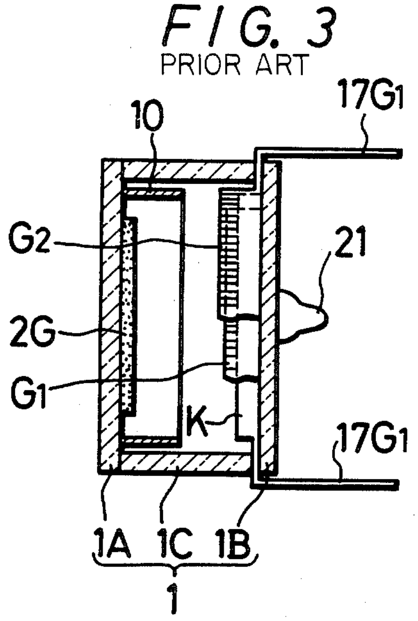
FIG. 3 PRIOR ART
FIG. 3 is a sectional view taken on line B—B of FIG. 1.
Figure 5:
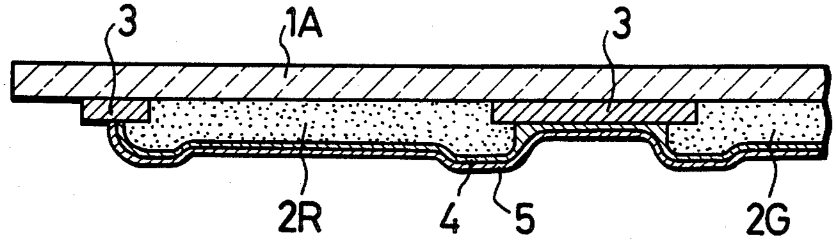
FIG. 5 PRIOR ART
FIG. 5 is an enlarged sectional view of a display segment.
Figure 4:
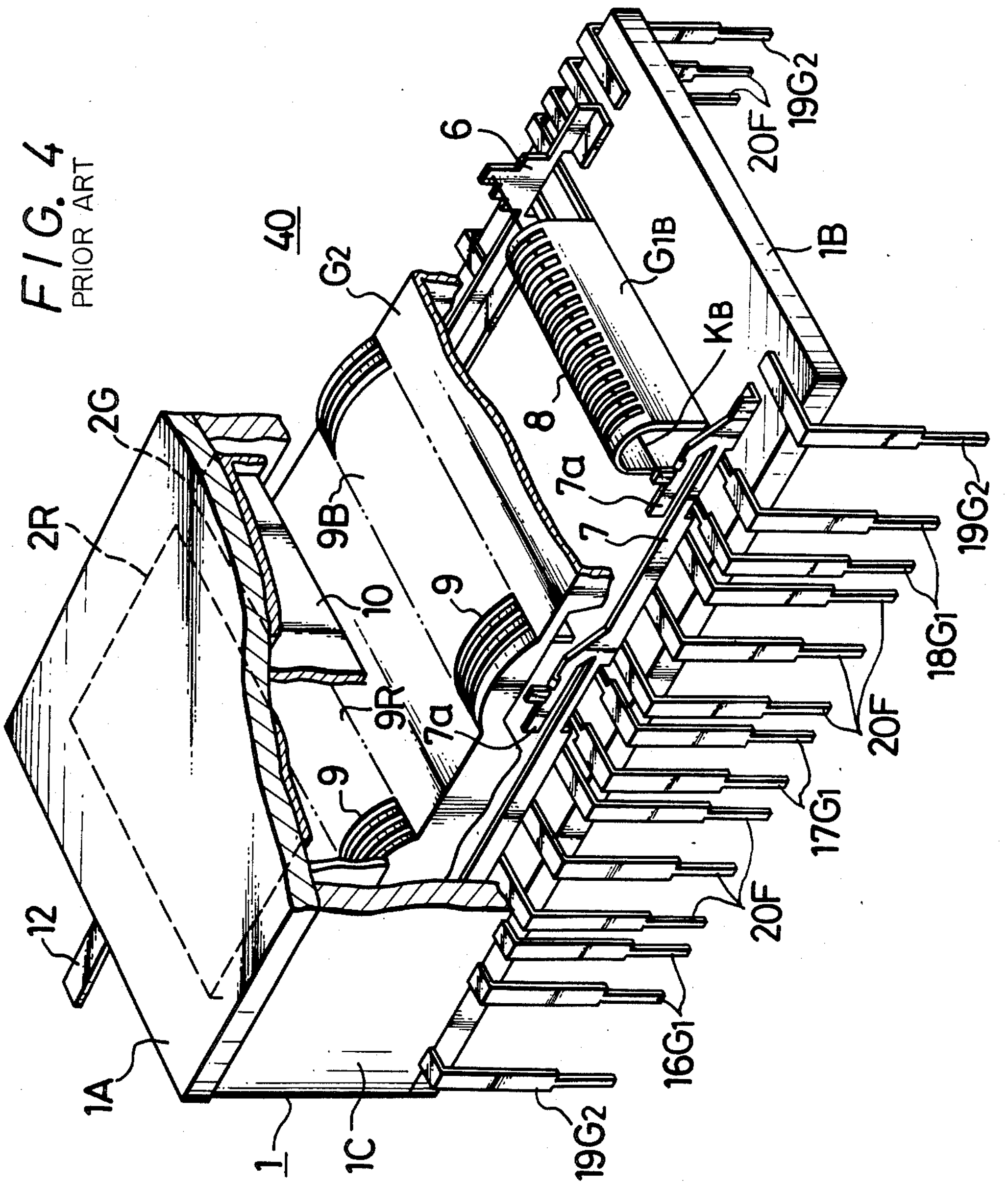
FIG. 4 PRIOR ART
FIG. 4 is a partially cut-away perspective view of the luminescent or fluorescent display cell in FIG. 1.
Figure 6:
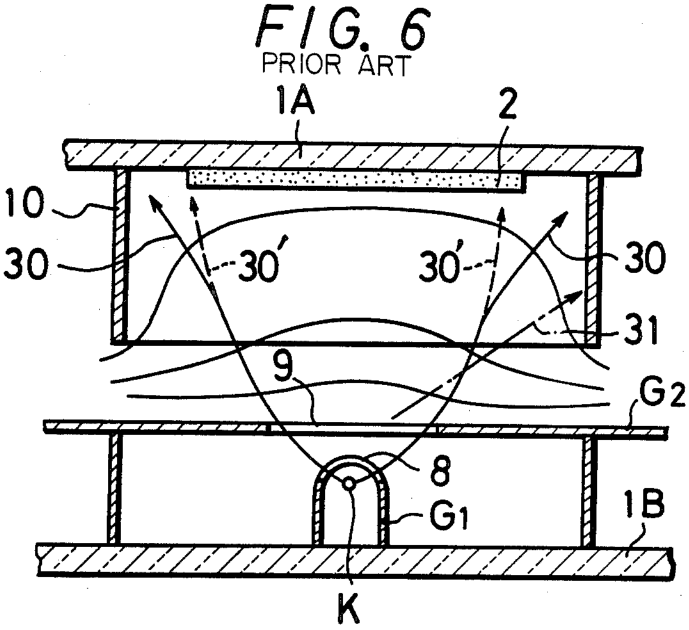
FIG. 6 PRIOR ART
FIG. 6 is a sectional view illustrative of operation of a separator.
Figure 9:
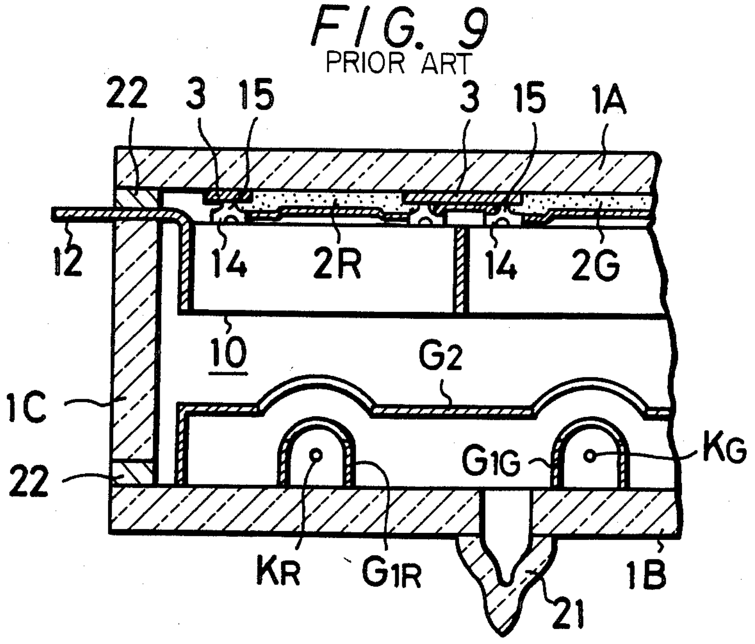
FIG. 9 PRIOR ART
FIG. 9 is a sectional view of display segments and a separator portion.
Figure 7:
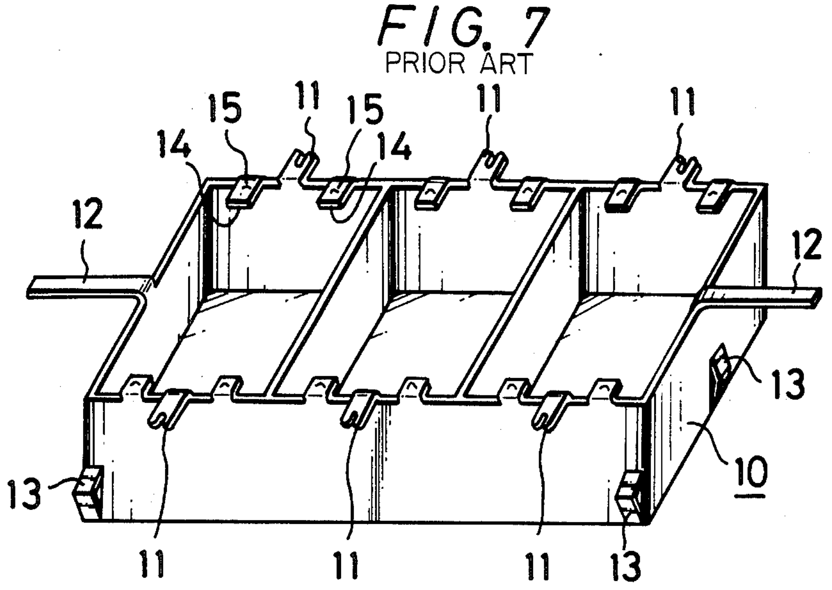
FIG. 7 PRIOR ART
FIG. 7 is a perspective view of the separator.
Figure 8:
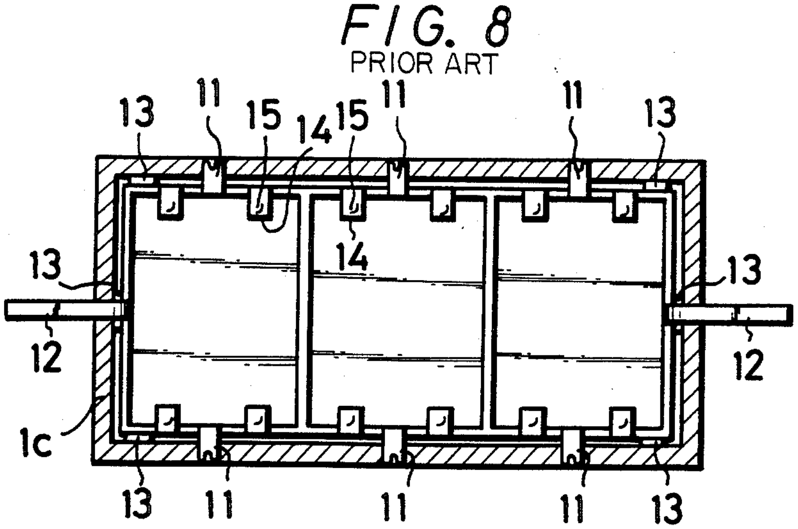
FIG. 8 PRIOR ART
FIG. 8 is a plan view in which the separator is disposed within a side of an envelope.
Figure 10:
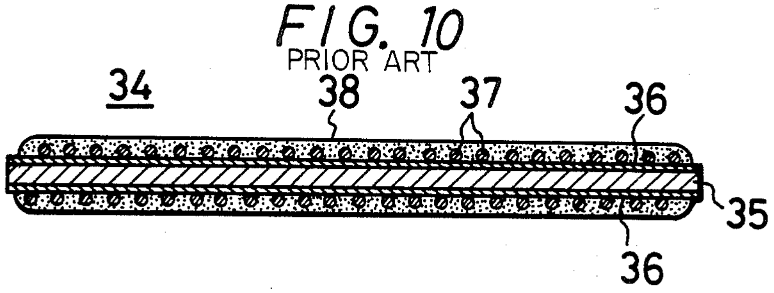
FIG. 10 PRIOR ART
FIG. 10 is a sectional view showing another example of a wire cathode.
Figure 11:
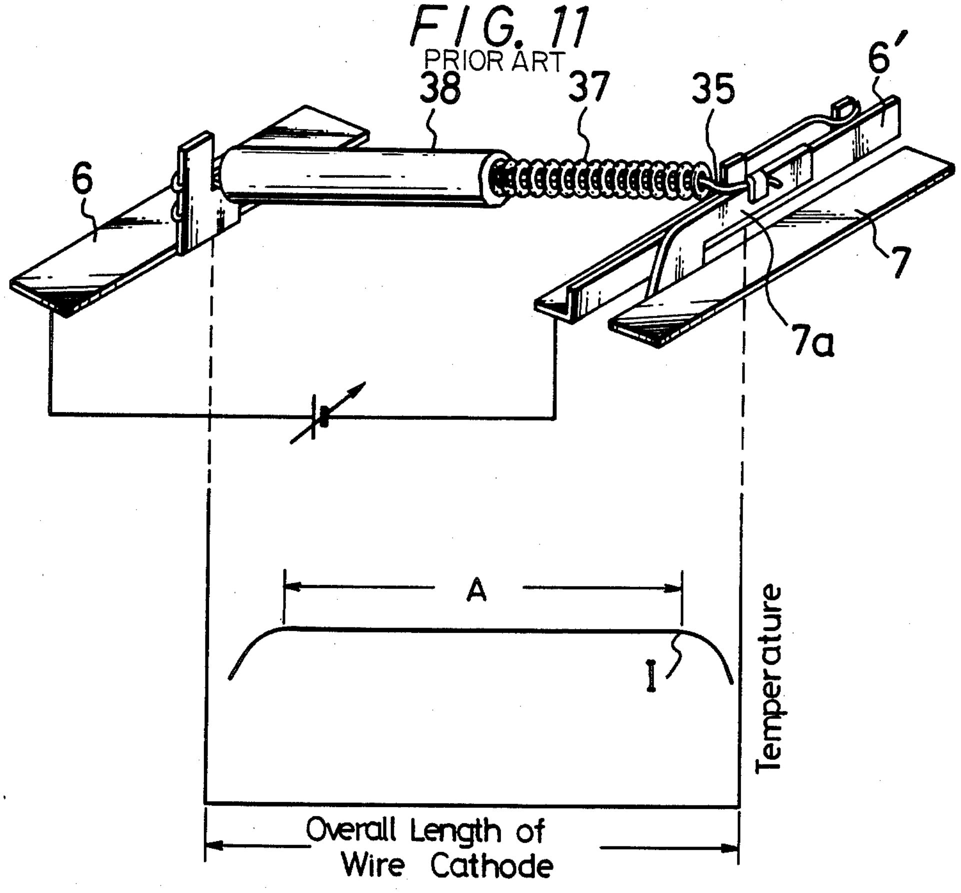
FIG. 11 PRIOR ART
FIG. 11 is a perspective view showing a mounted state thereof.
Figure 12:
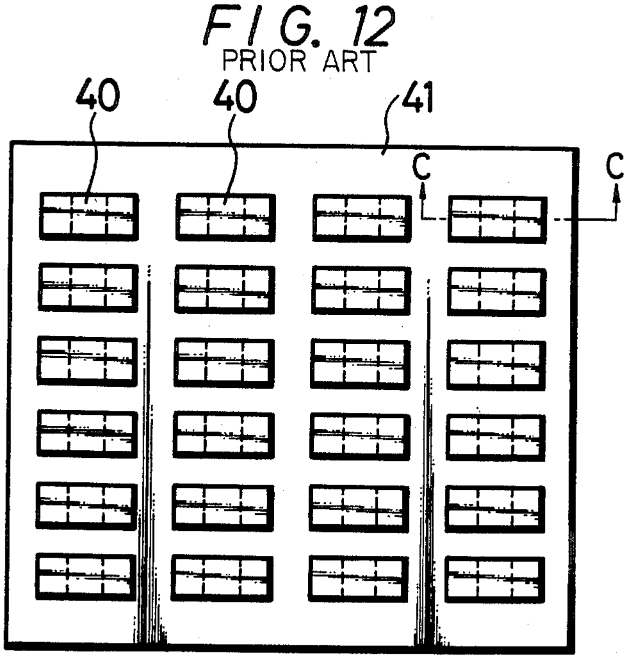
FIG. 12 PRIOR ART
FIG. 12 is a front view of a single unit incorporating a plurality of display cells.
Figure 13A:
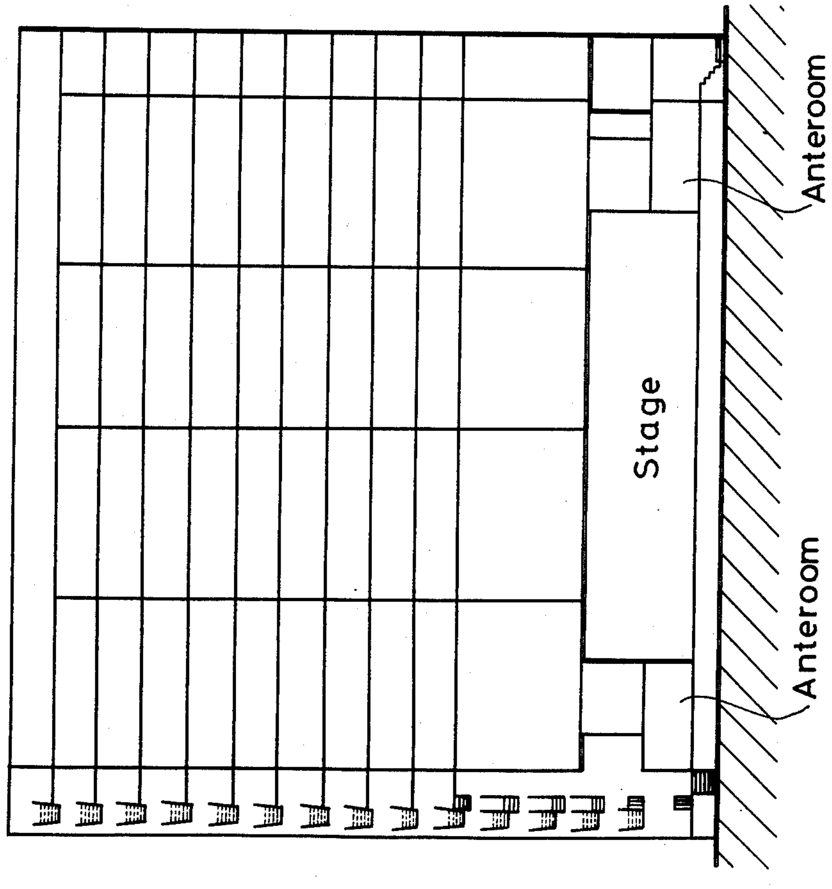
FIG. 13A PRIOR ART
Figures 13A and 13B are respectively a front view and a cross-sectional view of a built-up jumbo-size display device.
Figure 13B:
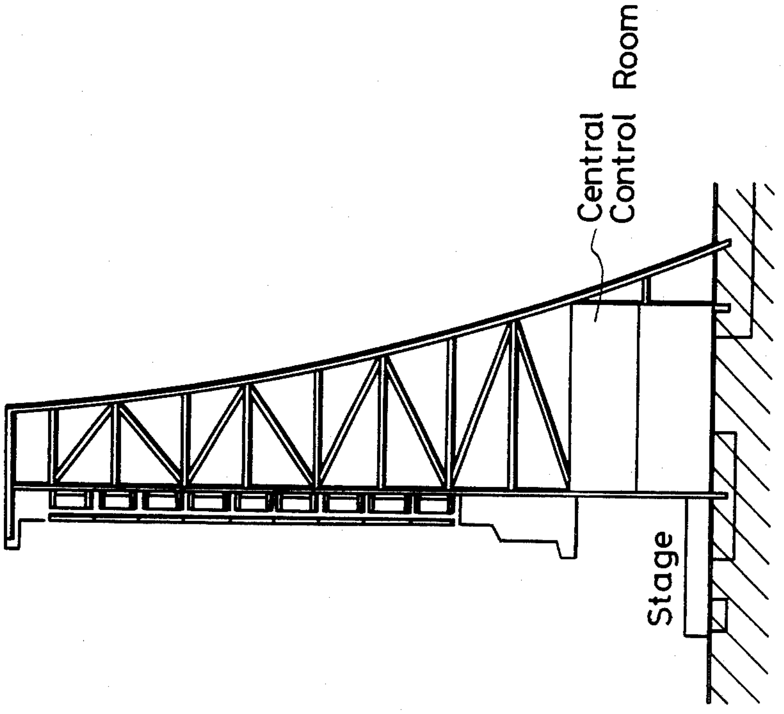
FIG. 13B PRIOR ART
Figure 14:
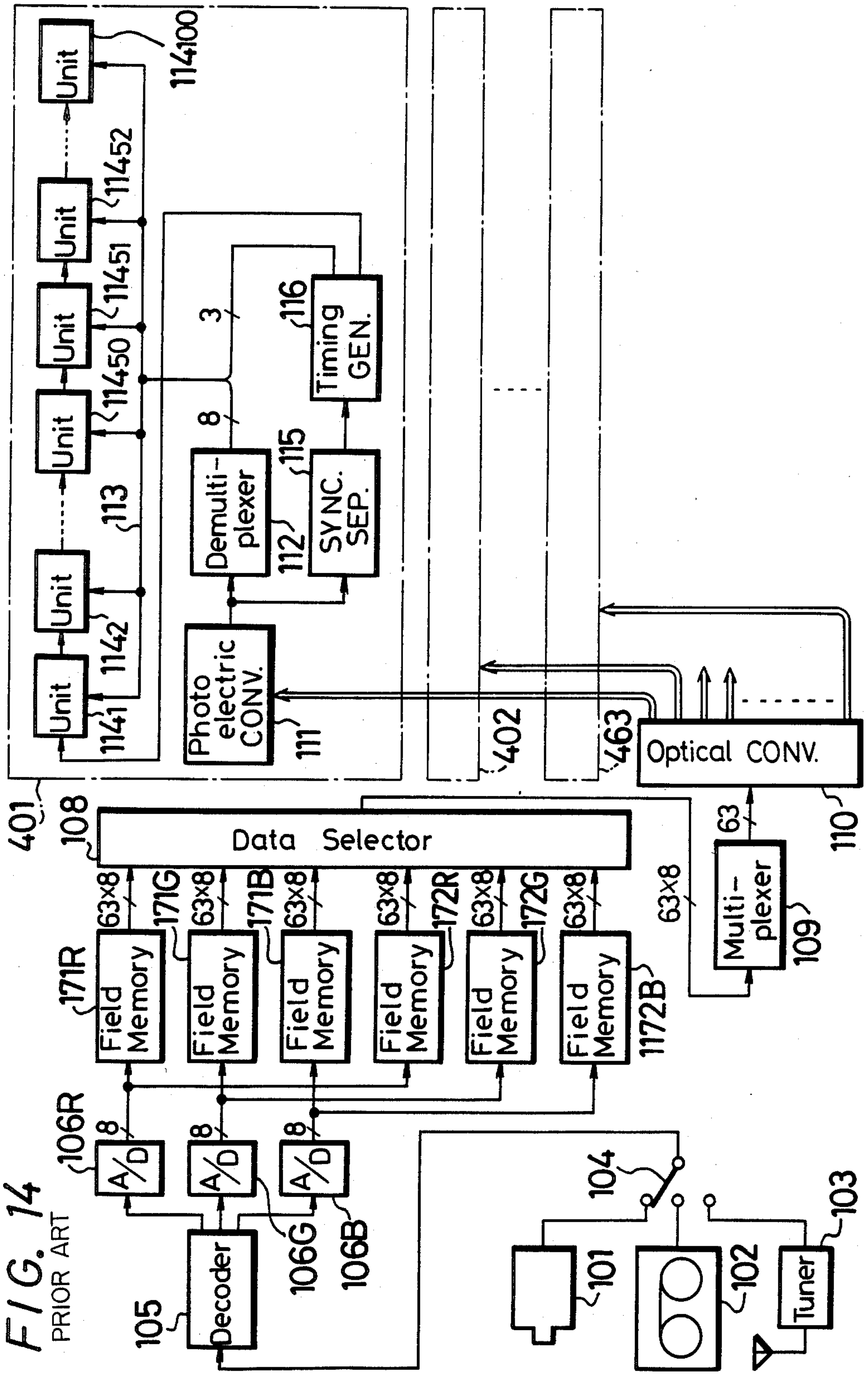
F I G. 14 PRIOR ART
FIG. 14 is a block diagram showing a display system used in the present invention.
Figures 15, 18:
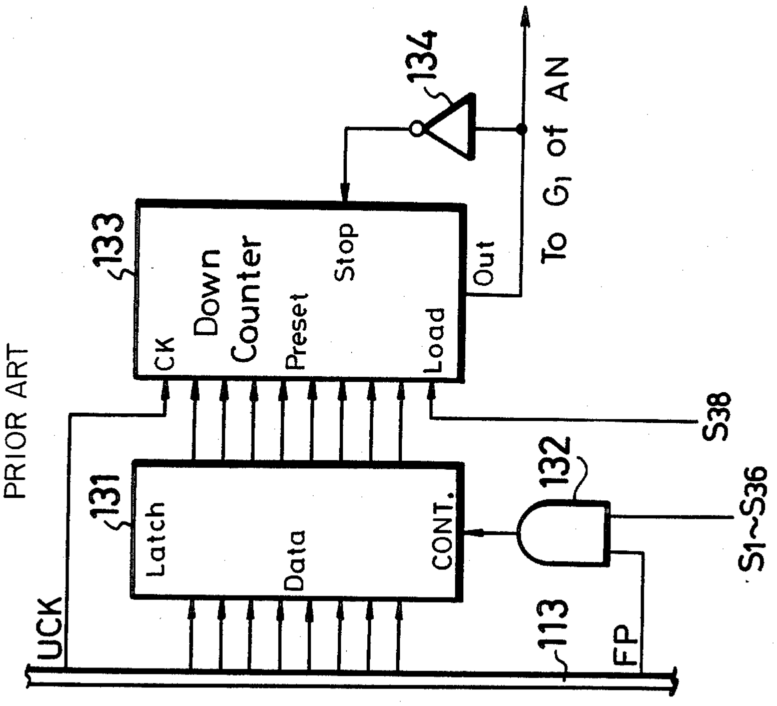
FIG. 18 PRIOR ART
FIG. 15 PRIOR ART
FIG. 15 is a diagram useful for explaining the operation of the display system shown in FIG. 14.
Figure 16E:
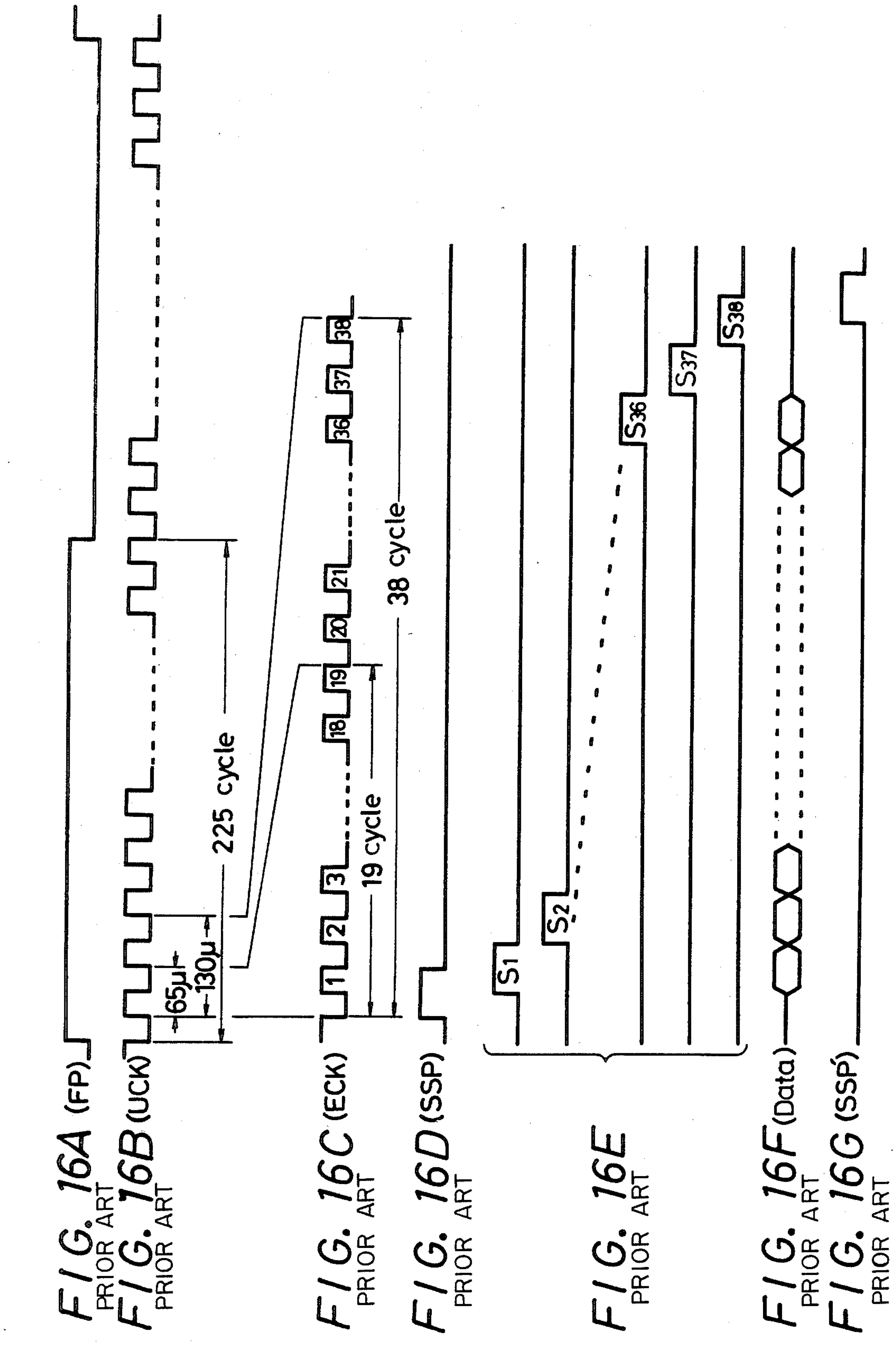
FIG. 16E PRIOR ART
Figure 17:
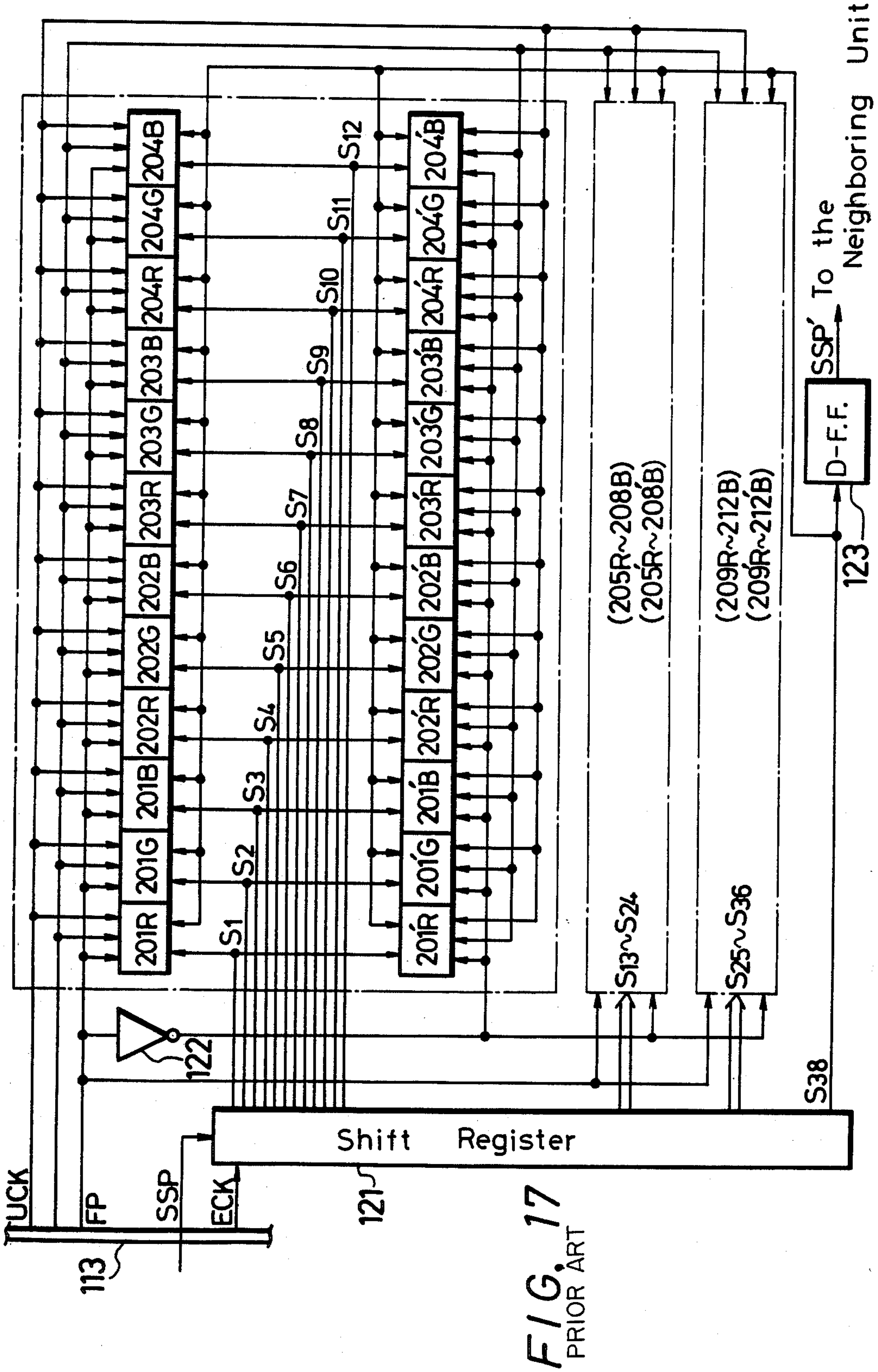
FIG. 17 PRIOR ART
Figure 19:
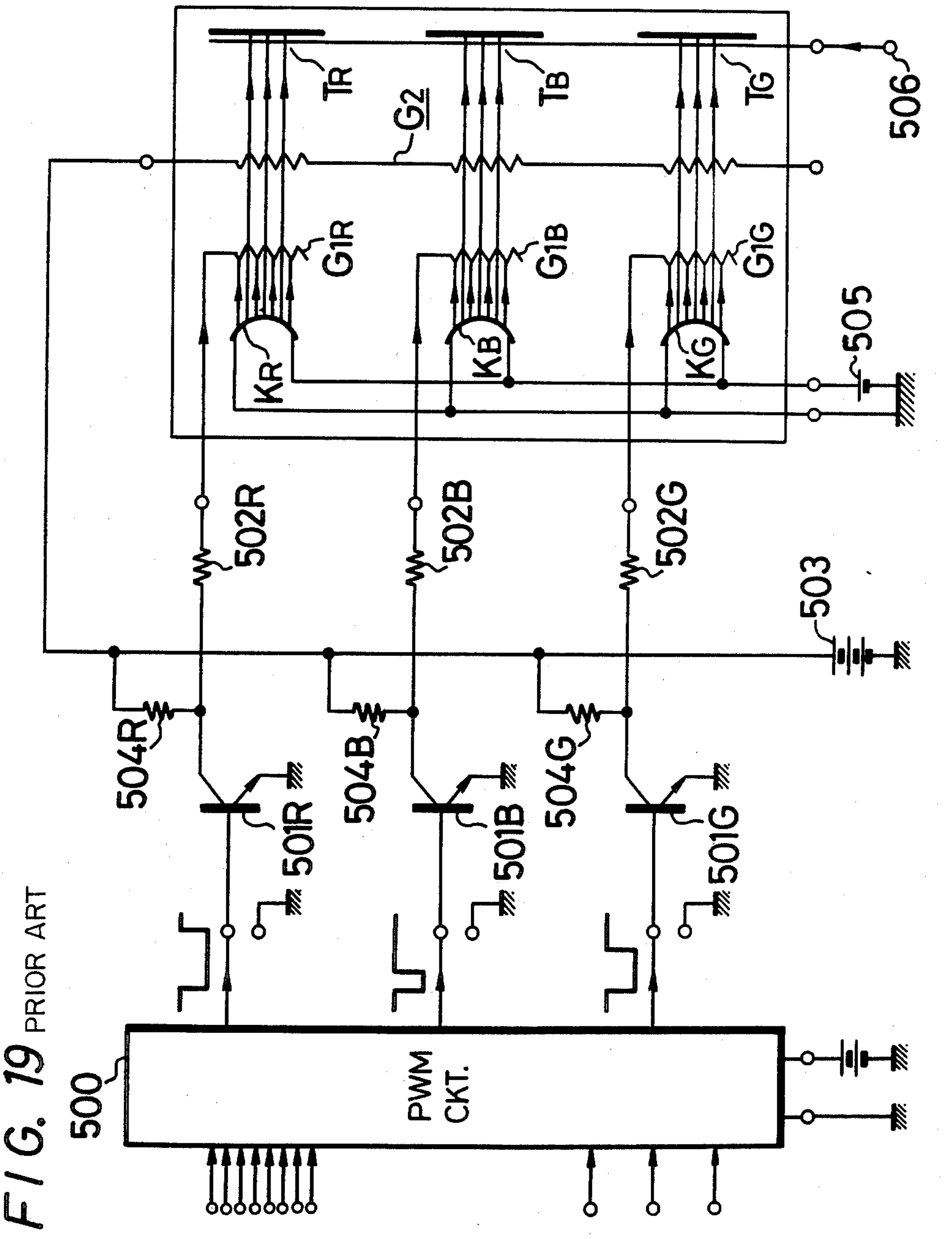
FIG. 19 PRIOR ART
Figure 20B:
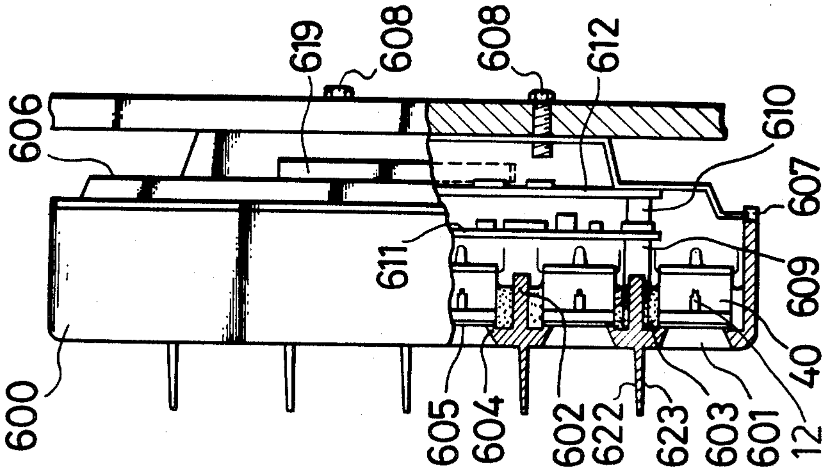
Figure 20A:
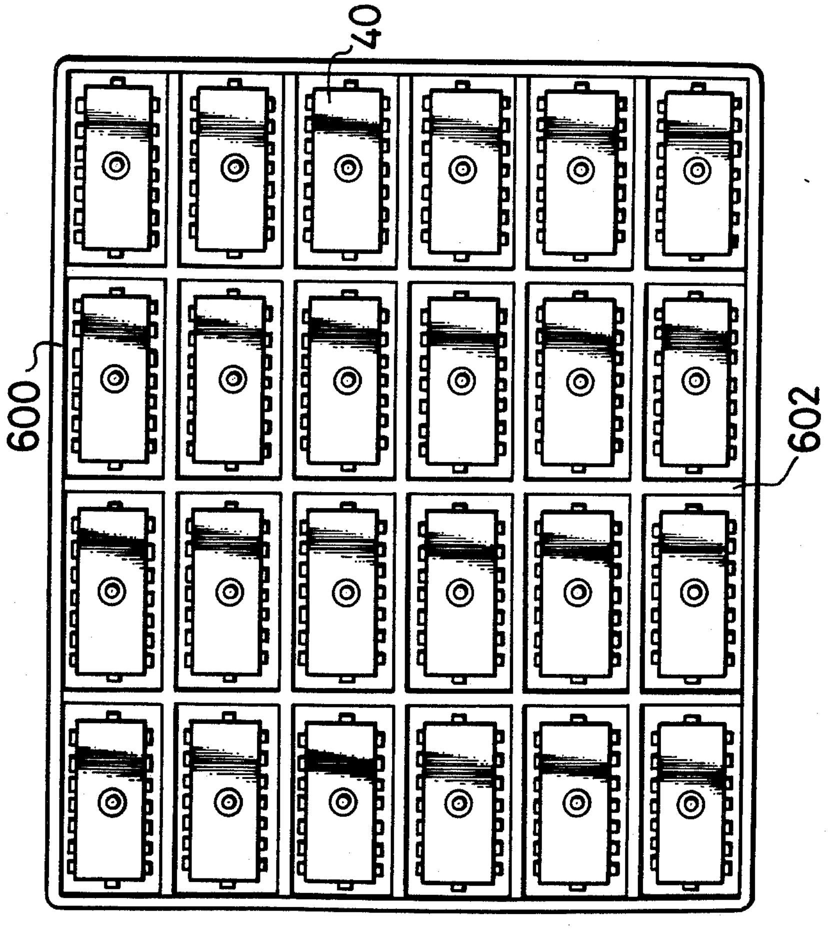
Figure 20C:
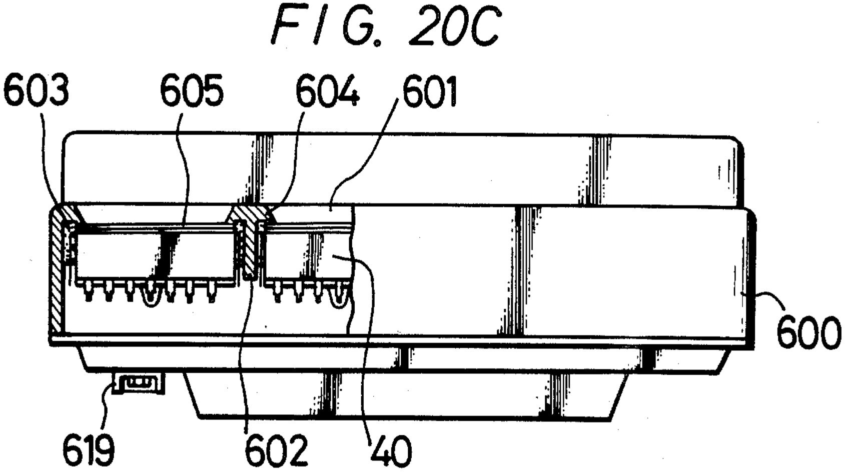
Figure 20D:
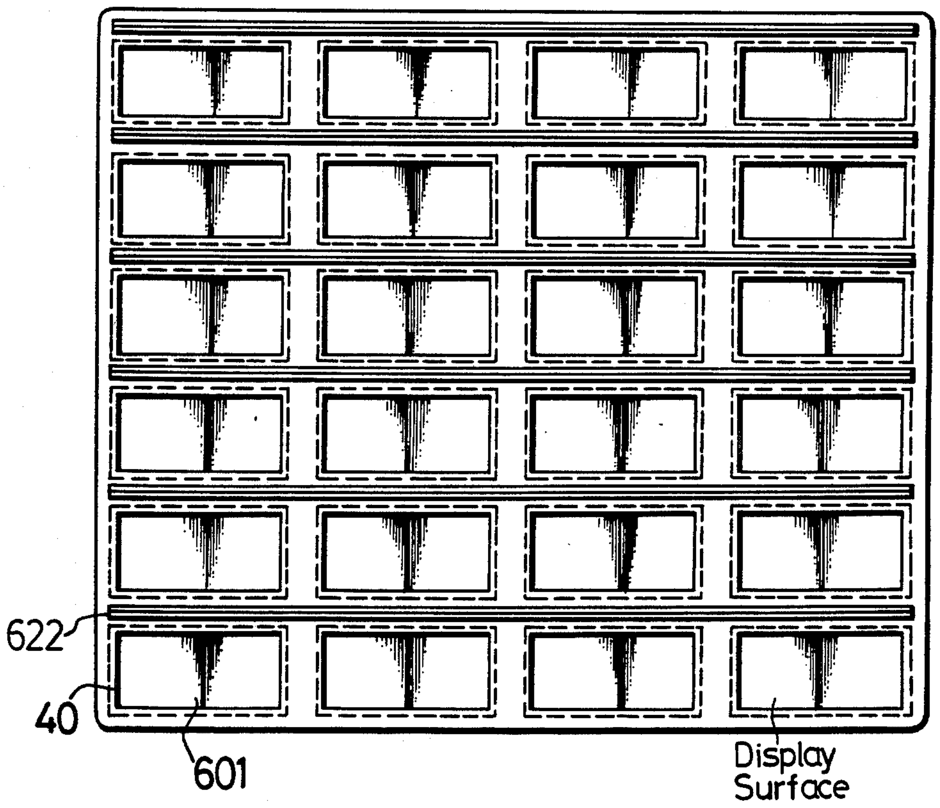
Figure 22B:
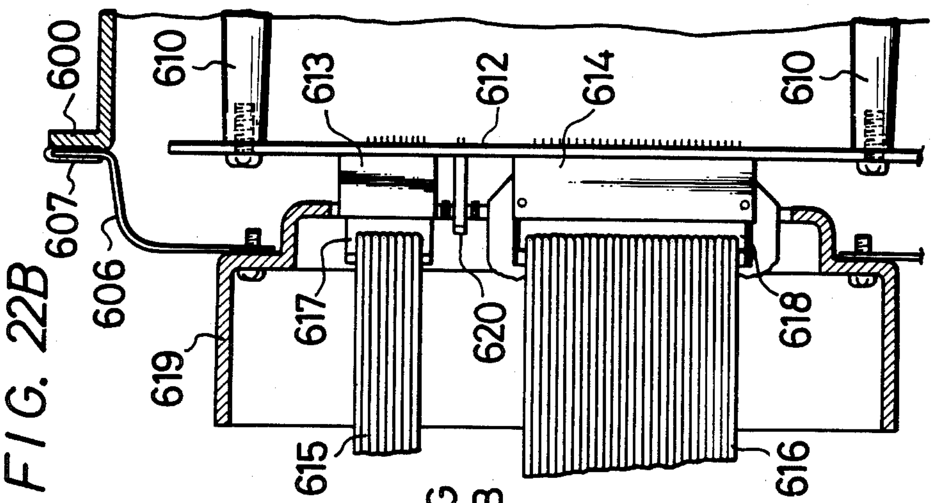
Figure 22A:
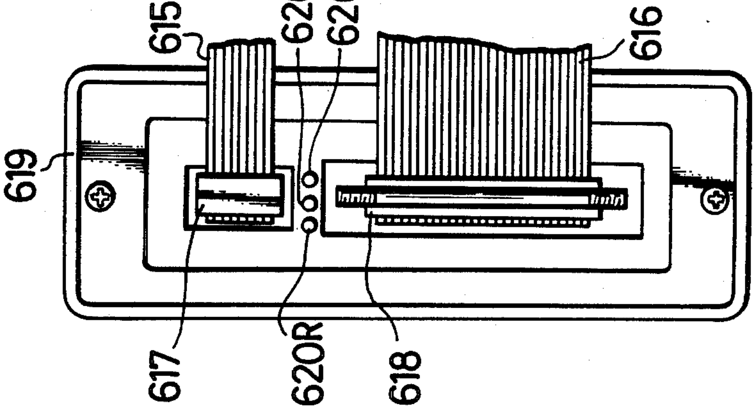
Figure 21:
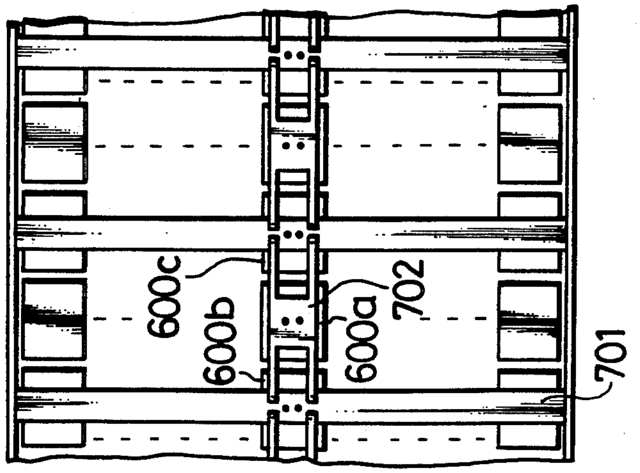
Figure 23:
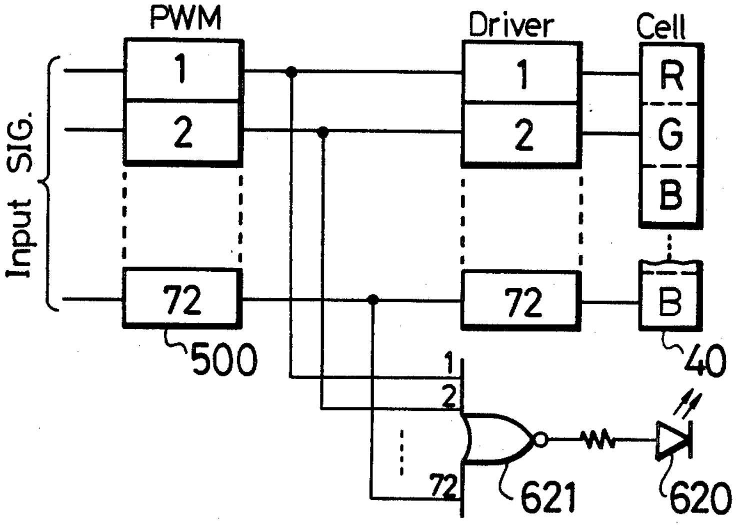
Figure 24:
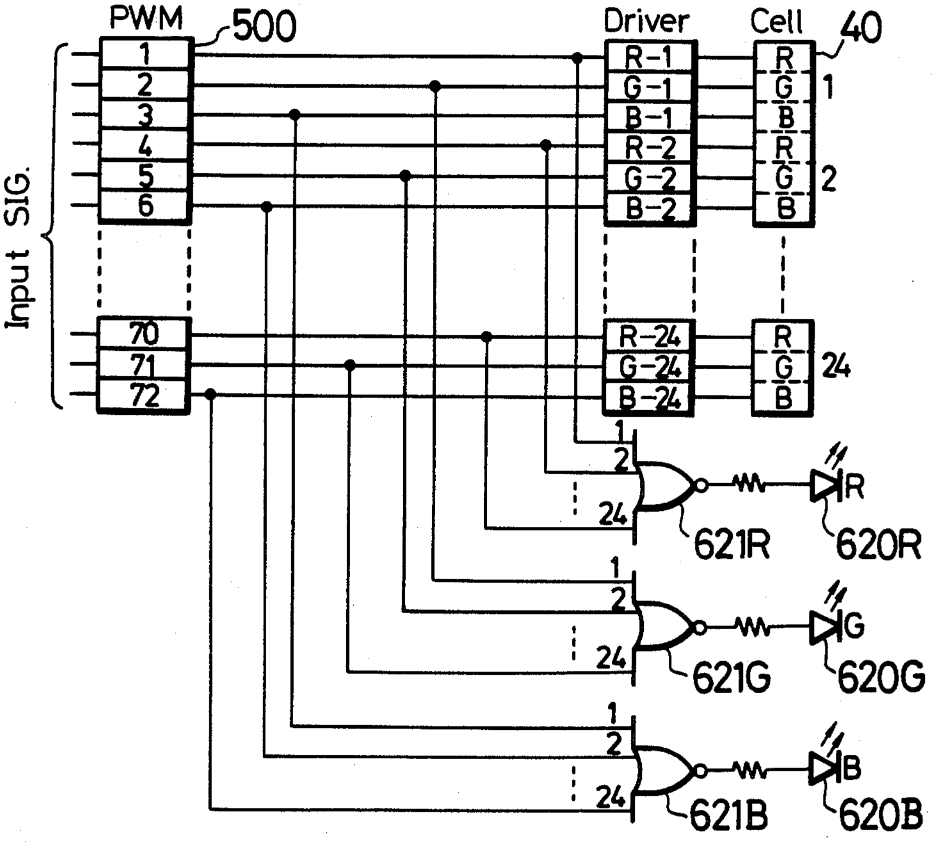
Figure 25:
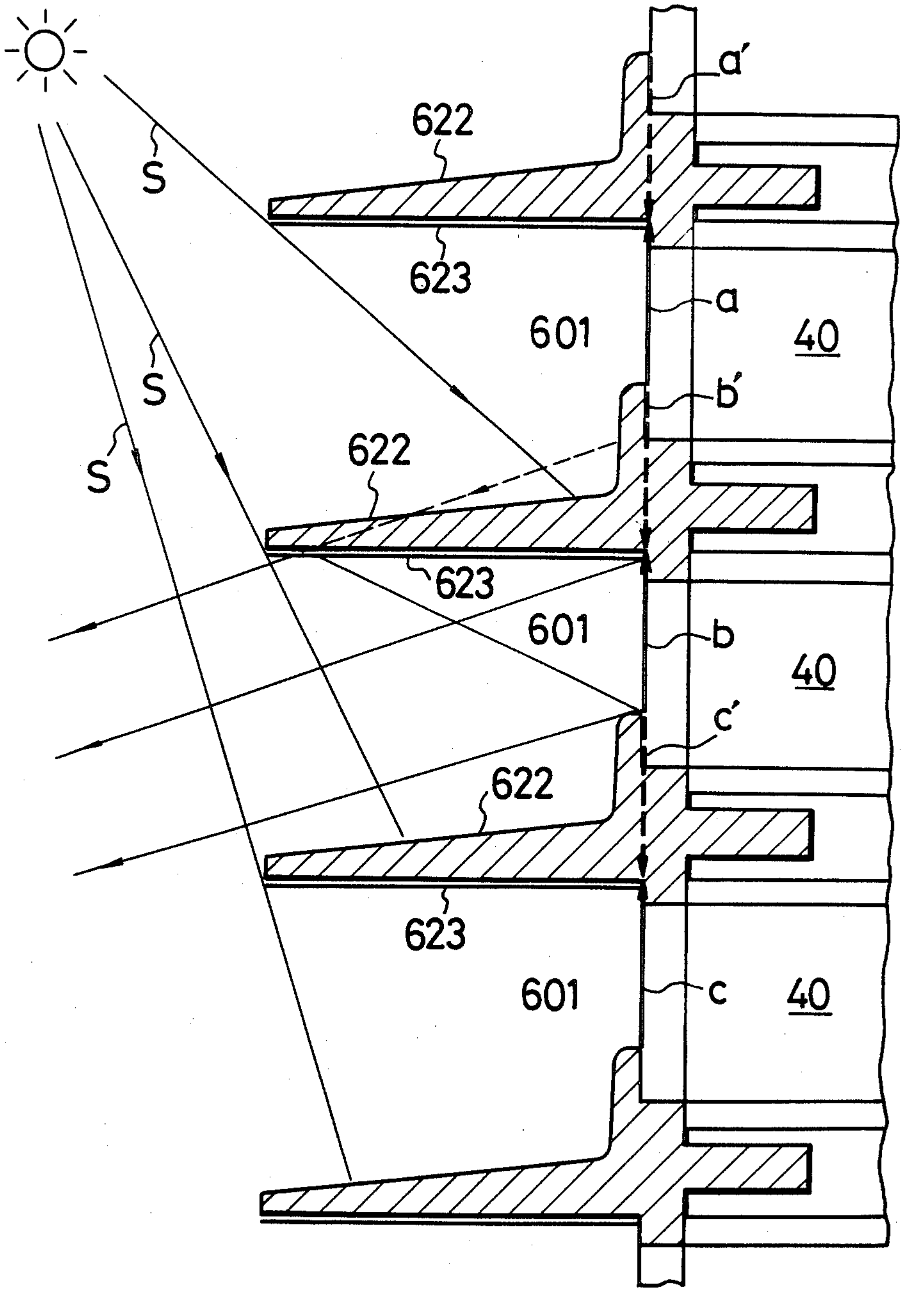
Figure 26:
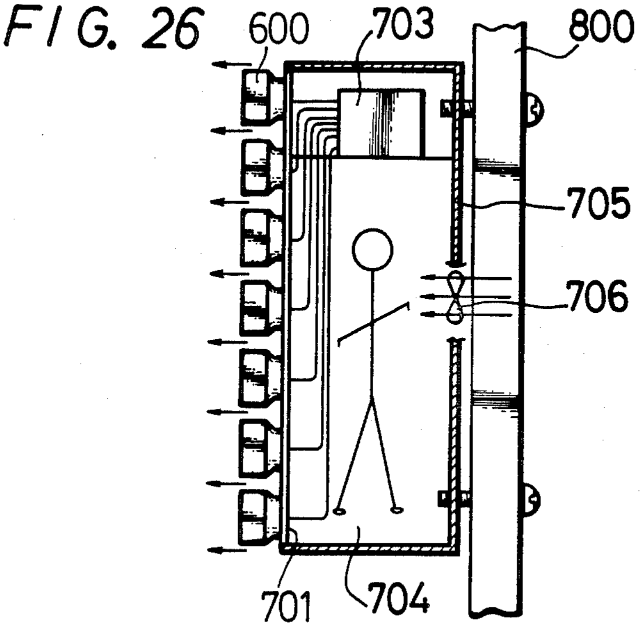
Figure 27:
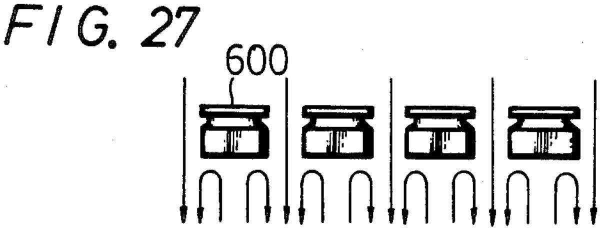
Figure 28:
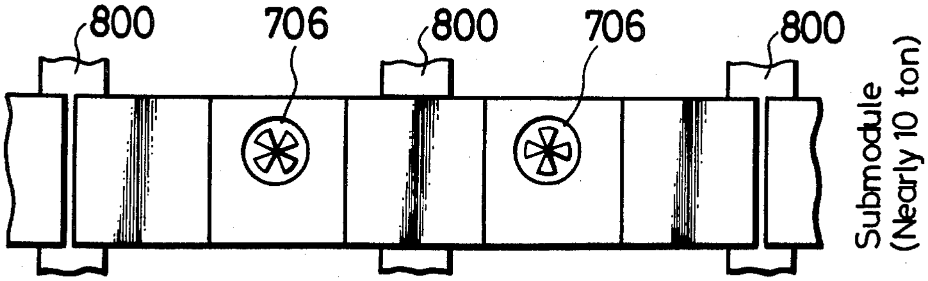
Figure 29A:
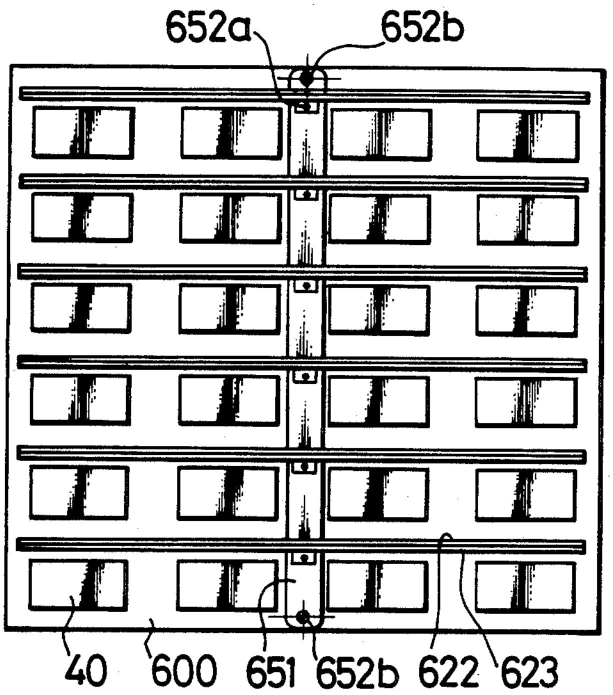
Figure 29B:
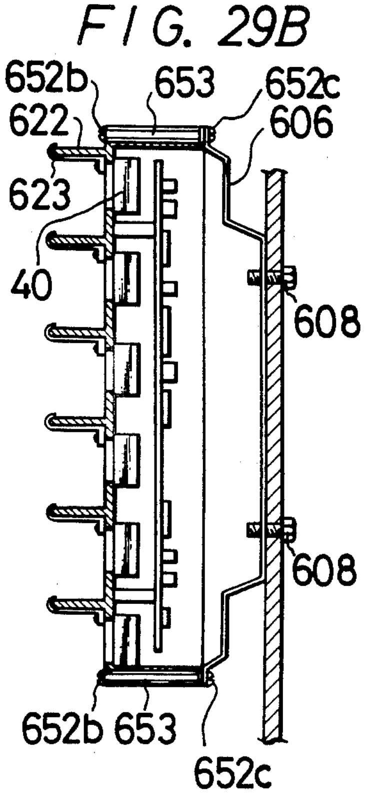
Figure 29C:
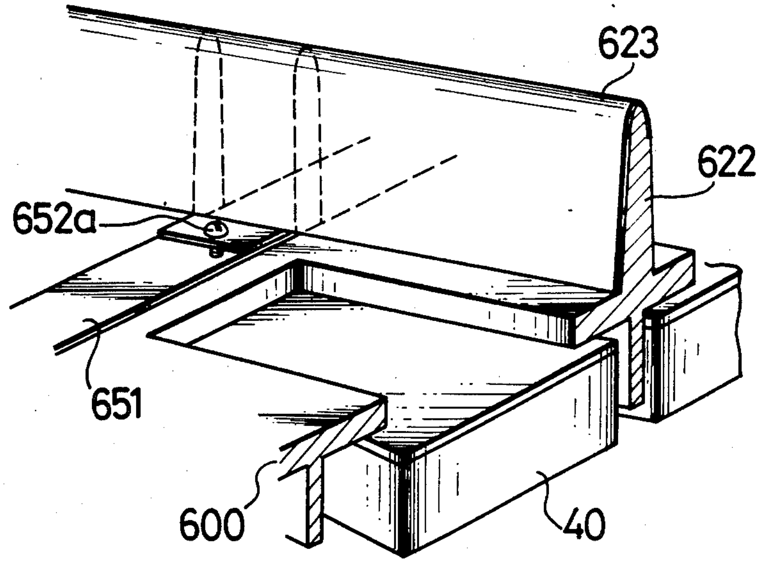

FIG.s 16A to 16G are respectively waveform diagram to be used for explaining the display device used in the present invention;

FIGS. 17 and 18 are respectively schematic diagrams showing a signal supplying system used in the present invention;

FIG. 19 is a circuit diagram showing an example of a drive circuit which drives each fluorescent display cell;

FIG. 20A is a rear view showing a display unit used in the present invention where a back cover is taken off;

FIG. 20B is partially cut-away side view of the display unit;

FIG. 20C is a partially cut-away base view of the display unit;

FIG. 20D is a front view of the display unit;

FIG. 21 is a rear view showing a mounting structure of unit cases;

FIGS. 22A and 22B are front and side views respectively showing a wiring structure to the display unit;

FIGS. 23 and 24 are block diagrams respectively showing examples of trouble indicating circuits used in the present invention;

FIG. 25 is a cross-sectional side view of a display unit according to an embodiment of the present invention;

FIG. 26 is a cross-sectional side view of a display submodule used in the present invention;

FIGS. 27 and 28 are conceptual diagrams respectively showing a cooling system used in the present invention;

FIG. 29A is a front view of a display unit according to an improved embodiment of the present invention;

FIG. 29B is a cross-sectional side view of the display unit in FIG. 29A; and FIG. 29C is a partially cut-away enlarged view showing a blind portion of the display unit in FIG. 29A.

DESCRIPTION OF THE PREFERRED EMBODIMENTS

Now, embodiments of the display system according to the present invention will hereinafter be described with reference to the attached drawings.

FIGS. 20A to 20D are respectively diagrams showing the structure of the display unit of the present invention. FIG. 20A is a rear view showing the display unit used in the present invention where a back cover thereof is taken off, FIG. 20B is a partially cut-away side view thereof, FIG. 20C is a partially cut-away base view thereof and FIG. 20D is a front view thereof.

In the embodiment shown in the figures, a unit case 600 is a cabinet made of strong material such as polycarbonate resin containing glass and so on. At the front thereof, there are provided 24 windows 601 which are arranged in an X—Y matrix form and at the back sides of the frames surrounding the windows 601, there are provided protruded portions 602 which are formed in the longitudinal and lateral directions so as to position the fluorescent display cells 40. At each compartment portion partitioned by this protruded portion 602, there is provided each fluorescent display cell 40 and the display surface thereof is opposed to the front side of the display system from the window 601.

Whe this fluorescent display cell 40 is attached to the unit case 600, the unit case 600 is placed horizontally with its back facing upwards and the back side surrounding each window 601 is coated with fluid resin 603 such as silicone rubber and so on. Thereafter, the fluorescent display cell 40 is inserted into the window 601 from the back side. In this case, around the back side of the window 601, there is provided a protruded rail 604 which can prevent the fluid resin 603 from flowing into the window 601. The coating of the fluid resin 603 is carried out by using a tool using air pressure. Furthermore, the fluorescent display cell 40 may be provided at its display surface facing to the window 601 with a transparent plastic film 605 having a predetermined thickness.

Under this state, the resin 603 is heated in, for example, a furnace to thereby be cured.

Further, high-voltage terminals 12 of the fluorescent display cells 40 are sequentially connected to each other through a cut-out portion (not shown) formed in the protruded portion 602 at its predetermined portion by a spot welding and so on. The fluid resin 603 is once again coated on this welded portion. Under this state, the fluid resin 603 is heated once again in the furnace and then cured.

In consequence, the fluorescent display cell 40 can be attached to the unit cas 600 easily and positively. After being cured, the silicone resin 603 is excellent in insulating property, water-proof property and good in heat-radiation property and heat-resistant property. Further, the high-voltage terminal 12 is insulated satisfactorily. Furthermore, by virture of the transparent plastic film 605, the display surface of the fluorescent display cell 40 which becomes high in temperature upon display is protected from direct raindrops and hence there is no fear that the display surface of the fluorescent display cell 40 will be broken by the rapid cooling.

To the back side of the unit case 600, there is attached a back cover 606 with its juncture made waterproof by a sealing member 607 such as rubber and so on. To the protruded portions of the back cover 606, there are inserted bolts 608 by which the unit case 600 is attached to a structure forming a submodule directly or through an adapter which will be described later.

FIG. 21 is a rear view showing the state where the unit case 600 is attached to the structure. In this case, steel frames 701 are provided at a predetermined spacing, in which the display unit is directly attached to every other steel frame 701 and the unit between the steel frames 701 is attached to the steel frame 701 through an adapter 702 of nearly H-shape.

Accordingly, in this display system, when the adapter 702 is removed from the steel frame 701, the central unit 600*a* can be removed. Further, under the state that the central display unit 600*a* is removed, it is possible to remove the display units 600*b* and 600*c* that are directly attached to the steel frames 701 at both sides.

Thus, each display unit 600 can be attached stably and removed with great ease upon maintenance, inspection and so on.

Inside the cabinet formed of the back cover 606 and the unit case 600, there are provided circuit boards 611 and 612 from the side of the unit case 600 through leg portions 609 and 610. On the circuit boards 612 at the rear side, there is provided a signal processing circuit, while on the circuit board 611 at the front side, there is provided a driving circuit for driving the fluorescent display cells 40.

Further, as shown in FIGS. 22A to 22B, the circuit board 612 is disposed so as to face at its rear side to the inner surface of the back cover 606, and receptacles 613 and 614 for use in supplying signals provided on this circuit board 612 are exposed to the rear side of the back cover 606 through openings formed therethrough. Further, around the opening of the back cover 606, there is provided a protection case 619 having an opening at the bottom thereof. Then, the receptacles 613 and 614 are respectively connected with outside connectors 617 and 618 that are connected to signal cables 615 and 616.

Accordingly, in this display system, the signal cables 615 and 616 are connected to each unit with great ease. Since the protection case 619 is provided around the opening of the back cover 616, the connected portion can be protected from the raindrops, dusts and the like and is large in mechanical strength against the external impact, thus reducing a fear that it will be broken and so on. Consequently, it is not necessary to use an expensive connector such as a Canon connector and hence the stable connection can be established by the receptacle and connector for a general electronic apparatus.

The water-proof property of the above portion can be increased by covering the back cover 606 around its opening by a sealing member such as rubber and the like, providing the protection case 619 with a lid which passes therethrough only the signal cable or covering the whole of the protection case 619 with a water-proof bag and so on.

Further, at the peripheral portions of these receptacles 613 and 614, there are provided trouble indicating light emitting devices 620R, 620G and 620B, respectively.

These light emitting devices 620R to 620B may become luminous by supplying all signals of a PWM (pulse width modulated) signal forming circuit 500 to a NOR circuit 621 as, for example, shown in FIG. 23 or by supplying independently three red, green and blue primary color signals of R, G and B to NOR circuits 621R, 621G and 621B, respectively, as shown in FIG. 24.

Accordingly, in this display system, when a picture image that is thoroughly white color is displayed, the output signals of the PWM signal forming circuit 500 become all low in level so that if the display system is in the normal operation mode, the input signals to the NOR circuits 621R, 621G and 621B all become low in level, thus the light emitting devices 620R to 620B being operated to emit light. On the other hand, if any one cell is mis-operated, the light emitting devices 620R to 620B are stopped emitting light.

In consequence, at the back side of the display system, an operator can find out the unit whose light emitting devices 620R to 620B have stopped emitting light and then carry out the replacement, repair and so on of the corresponding unit, etc.

When the red, green and blue color signals are respectively detected by the light emitting devices 620R to 620B, if, for example, only the light emitting device 620B has stopped emitting a light, the corresponding unit may not always be repaired.

While in the above-described example the PWM signal forming circuit 500 is mis-operated, if the trouble of the fluorescent display cell 40 is detected, such detection will be carried out as follows.

If, the picture screen is monitored by TV (television) camera located at a long distance from the display device and when a trouble is found in a unit, the display on the picture screen is erased and a video signal of a cross-shaped cursor with the width of each unit at the crossing point of the longitudinal and lateral directions is formed and then displayed. Thus, at the back side of the unit, the unit whose light emitting devices 620R to 620B are rendered luminous is searched in the lateral direction. If a unit at the crossing point of the upper and lower units whose light emitting devices 620R to 620B are rendered luminous is discovered, such discovered unit becomes the crossing point of the cursor, or the unit having the trouble.

Further, in the unit case 600 shown in, FIGS. 20A to 20D blinds 622 are provided on the windows 601 at the upper sides thereof in the front sides as shown in FIG. 25. These blinds 622 each have a black surface at the top thereof and a mirror or reflecting surface 623 at the bottom thereof.

Accordingly, in this display system, if a light ray S of the sun, a sky blue of the sky and so on are incident on the display surface, these light rays are shielded by the blind 622 and do not reach to and are not reflected by the display surface of the fluorescent display cell 40, thus the display being prevented from being disturbed.

Displays a, b and c on the display surface are reflected by the reflecting surfaces 623 to thereby form virtual images a', b' and c' so that the discontinuous display in the vertical direction can be removed.

Further, as described above, this display system is formed of a plurality of submodules, which then are installed in the building so as to be assembled. In this case, as shown in FIG. 26, each submodule has a space of a predetermined width at the rear side thereof in which a high voltage supplying circuit 703 and so on are formed and a path 704 for operators are secured.

Furthermore, in the front side of the submodule, the unit case 600 is attached to the steel frame 701 (see also FIG. 21) to thereby provide a space between the adjacent unit cases 600, while at the back side thereof, the floor, ceiling and the rear surface thereof are nearly tightly closed by a wall 705.

Therefore, on the wall 705 at its predetermined portion of the back side, there is formed an opening in which a cooling fan 706 is provided.

This cooling fan 706 is driven to flow the air thereinto to thereby raise the air pressure in the inside of the submodule surrounded by the wall 705. Then, the air having high air pressure is flowed through the spacing between the adjacent unit cases 600.

Thus, the convection shown by an arrow in FIG. 27 as seen from the top view is generated so that the display surface of each display cell in the unit cases 600 is cooled by the flow of air.

When the submodules are attached to posts or frames 800 of the building as, for example, shown in FIG. 28, it is enough that the cooling fans 706 are provided at two places in each submodule one on each side of fram 800.

FIGS. 29A to 29C show another improved embodiment of the display system according to the present invention. In the embodiment of FIGS. 29A to 29C, at the central portion in the front of the unit case 600, there is provided a strip grounding plate 651 in the vertical direction and to this strip grounding plate 651, there is electrically connected a stainless steel plate which forms the reflecting surface of each blind 622 by a bolt **652*a*. The both ends of this strip grounding plate 651 are electrically connected to one end of a metal conductor or nut 653 by bolts 652*b* and further, the other end of the metal conductor 653 is connected to the back cover 606 of the unit case 600 by a bolt 652*c***.

The back cover 606 is generally made of metal and is attached by bolts 608 to the steel frame and so which will construct the submodule.

Consequently according to this display system, the conductive reflecting surface 623 is grounded by the steel frame and the like which form the submodule through the bolt **652*a*, the stripe grounding plate 651, the bolt 652*b*, the metal conductor 653, the bolt 652*c* and the back cover 606**.

The reflecting surface 623 and the strip grounding plate 651 are practically arranged as, for example, shown in FIG. 29C in which at the portion to place the strip grounding plate 651, the blind 622 is cut away as shown by a broken line.

As described above, the conductive reflecting surface 623 is grounded and accordingly, in the display system as shown in FIGS. 29A to 29C, the reflecting surface 623 is prevented from being electrified. Since atmospherics and lighting are grounded, there is no fear that the circuits and so on within the display system will be broken. Further, since the conductive reflecting surface 623 that is grounded has a shield effect, this can prevent undesired radiation.

In FIGS. 29A to 29C, the connection by the bolts **652*a*, 652*b* and 652*c* are not always necessary and it is sufficient to keep the electrical connection thereamong. The strip grounding plate 651 is not limited to the above-described strip shape but may be a conductor of a plate-shape, braided wire and the like. In addition, when this strip grounding plate 651 is made of a rigid body, this can be served as the reinforcing material of the unit case 600**.

As set forth above, according to the present invention, the display of good quality can be made by the display system of simple construction.

Further, according to the improved embodiment of this invention, since the reflecting surface is grounded, this reflecting surface can be prevented from being electrified.

Furthermore, since the atmospherics and the lighting are grounded, there is no fear that the circuits and the like inside the display system will be broken. In addition, the undesired radiation can be shielded.

The above description is given on the preferred embodiments of the invention, but it will be apparent that many modifications and variations could be effected by one skilled in the art without departing from the spirits or scope of the novel concepts of the invention.

For example, the invention is applicable not only to a video signal display system mentioned above but also to any signal display system where a plurality of display cells are arranged in a vertical direction. Therefore, the scope of the invention should be determined by the appended claims only.

We claim as our invention:

1. A display system comprising:

a plurality of display cells arranged in a vertically-disposed X-Y matrix to form a display device, each of said display cells representing a single picture element and being provided with a horizontally-extending blind adjacent its upper edge, said horizontally-extending blind having a black top surface and a reflecting bottom surface;

a signal source for supplying a standard video signal; and driving means for supplying said standard video signal to said display cells such that a picture is reproduced on said display device.

2. A display system according to claim 1, wherein said display cells are fluorescent display cells.

3. A display system according to claim 1, wherein each of said display cells comprises a R (red), a G (green) and a B (blue) fluorescent display element to enable said display system to reproduce a color picture.

4. A display system according to claim 1 wherein said reflecting bottom surface of said horizontally-extending blind is electrically conductive, and wherein said display system further comprises means for electrically grounding the electrically-conductive reflecting bottom surface of the horizontally-extending blind of each of said plurality of display cells.

5. A display system comprising:

a signal source for supplying a video signal;

a plurality of display units arranged in a vertically-disposed X-Y matrix to form a display device, each of said display units comprising a plurality of fluorescent display cells arranged in a vertically-disposed X-Y matrix and a plurality of horizontally-extending blinds, each of said blinds being disposed adjacent the upper edges of the display cells in a row of the X-Y matrix and having a black top surface and a conductive reflecting bottom surface, each of said display units further comprising means for electrically grounding the conductive reflecting bottom surface of each of said plurality of horizontally-extending blinds and driving means for supplying said video signal to said display units such that a picture is reproduced on said display device.

6. A display system according to claim 5 wherein said means for electrically grounding comprises a vertically-extending conductive strip electrically contacting the conductive reflecting bottom surface of each of said plurality of horizontally-extending blinds and means for electrically grounding said conductive strip.

* * * * *